US011416812B2

(12) United States Patent
Yamaguchi et al.

(10) Patent No.: US 11,416,812 B2
(45) Date of Patent: Aug. 16, 2022

(54) DELIVERY ASSISTANCE DEVICE, CUSTOMER TERMINAL, AND DELIVERY ASSISTANCE METHOD

(71) Applicant: NEC Corporation, Tokyo (JP)

(72) Inventors: Hiromi Yamaguchi, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 667 days.

(21) Appl. No.: 16/327,406

(22) PCT Filed: Aug. 22, 2017

(86) PCT No.: PCT/JP2017/029880
§ 371 (c)(1),
(2) Date: Feb. 22, 2019

(87) PCT Pub. No.: WO2018/038085
PCT Pub. Date: Mar. 1, 2018

(65) Prior Publication Data
US 2021/0287158 A1 Sep. 16, 2021

(30) Foreign Application Priority Data
Aug. 23, 2016 (JP) .............................. JP2016-162594

(51) Int. Cl.
*G06Q 10/06* (2012.01)
*G06Q 10/08* (2012.01)
*G06Q 50/30* (2012.01)

(52) U.S. Cl.
CPC ....... *G06Q 10/087* (2013.01); *G06Q 10/0833* (2013.01); *G06Q 10/08355* (2013.01); *G06Q 50/30* (2013.01)

(58) Field of Classification Search
CPC ..................... G06Q 10/087; G06Q 10/08355
(Continued)

(56) References Cited

U.S. PATENT DOCUMENTS

2012/0084223 A1* 4/2012 Brief ................ G06Q 10/08355
705/338
2015/0161564 A1* 6/2015 Sweeney ................ G06Q 50/30
705/338

FOREIGN PATENT DOCUMENTS

JP 2002-007906 A 1/2002
JP 2007-304633 A 11/2007
JP 2011-221984 A 11/2011

OTHER PUBLICATIONS

International Search Report of PCT/JP2017/029880 dated Oct. 10, 2017.
(Continued)

*Primary Examiner* — Rokib Masud
(74) *Attorney, Agent, or Firm* — Sughrue Mion, PLLC

(57) ABSTRACT

Provided is a delivery assistance device enabling shortening of the time required for delivery in purchase of an item by online shopping. This delivery assistance device is provided with: management means for managing stock information about stock of an item held by each of a plurality of traveling vehicles; first reception means for receiving current position information indicating a current position of the traveling vehicle; first transmission means for transmitting the stock information to a customer terminal; second reception means for receiving order information and delivery address information; specification means for specifying a traveling vehicle arriving earliest at the delivery address; and second transmission means for transmitting the order information to the specified traveling vehicle, wherein the management means updates the stock information about stock of an item held by the specified traveling vehicle, based on the order information.

7 Claims, 18 Drawing Sheets

(58) Field of Classification Search
USPC .......................................................... 705/28
See application file for complete search history.

(56) References Cited

OTHER PUBLICATIONS

"Mobile Supermarket Tokushimaru" [online], [retrieved on Jul. 13, 2016], retrieved from the Internet: <http://www.tokushimaru.jp/>.
Written Opinion of PCT/JP2017/029880 dated Oct. 10, 2017.
Japanese Office Communication for JP Application No. 2018-535686 dated Oct. 12, 2021 with English Translation.

* cited by examiner

Fig.10

| ITEM NAME | UNIT PRICE | STOCK INFORMATION / STOCK QUANTITY | | |
|---|---|---|---|---|
| | | TRAVELING VEHICLE SA | TRAVELING VEHICLE SB | TRAVELING VEHICLE SC |
| RICE (10 KG) | ¥2980 | 10 | 3 | 1 |
| MILK (1 L) | ¥198 | 3 | 5 | 3 |
| SOYBEAN PASTE (650 G) | ¥398 | 1 | 6 | 2 |
| CHLOROPHYLL JUICE (30 BAGS) | ¥1170 | 5 | 0 | 0 |
| VEGETABLE JUICE (200 ML) | ¥98 | 10 | 0 | 0 |
| PEAR | ¥605 | 0 | 5 | 0 |
| BAUMKUCHEN | ¥298 | 0 | 9 | 0 |
| BANANA | ¥50 | 0 | 0 | 3 |
| ORANGE | ¥128 | 0 | 0 | 5 |
| APPLE | ¥99 | 0 | 2 | 6 |
| TOMATO | ¥108 | 0 | 7 | 0 |

Fig.11

CUSTOMER INFORMATION

| CUSTOMER ID | NAME | ADDRESS | TEL |
|---|---|---|---|
| 0001 | CUSTOMER UA | A-a, NAKAHARA-KU, KAWASAKI | 044-431-XXXX |
| 0002 | CUSTOMER UB | A-b, NAKAHARA-KU, KAWASAKI | 044-431-YYYY |
| 0003 | CUSTOMER UC | A-c, NAKAHARA-KU, KAWASAKI | 044-431-ZZZZ |
| ·· | ·· | ·· | ·· |
| ·· | ·· | ·· | ·· |

Fig.16

| ITEM NAME | SALES PRICE | STOCK QUANTITY | ORDER |
|---|---|---|---|
| RICE (10 KG) | ¥2980 | 14 | ADD TO CART |
| MILK (1 L) | ¥198 | 11 | ADD TO CART |
| SOYBEAN PASTE (650 G) | ¥398 | 9 | ADD TO CART |
| CHLOROPHYLL JUICE (30 BAGS) | ¥1170 | 5 | ADD TO CART |
| VEGETABLE JUICE (200 ML) | ¥98 | 10 | ADD TO CART |
| PEAR | ¥605 | 5 | ADD TO CART |
| BAUMKUCHEN | ¥268 | 9 | ADD TO CART |
| BANANA | ¥50 | 3 | ADD TO CART |
| ORANGE | ¥128 | 5 | ADD TO CART |
| APPLE | ¥99 | 8 | ADD TO CART |
| TOMATO | ¥108 | 7 | ADD TO CART |

ORDERING SCREEN

PROCEED TO PAYMENT SCREEN

Fig. 18

| ITEM NAME | SALES PRICE | ORDER QUANTITY | SUBTOTAL | TO CUSTOMER |
|---|---|---|---|---|
| APPLE | ¥99 | 1 | ¥99 | WILL BE DELIVERED FROM TRAVELING VEHICLE SC |
| TOMATO | ¥108 | 1 | ¥108 | WILL BE DELIVERED FROM TRAVELING VEHICLE SB |
| MANDARIN ORANGE | ¥128 | 1 | ¥128 | WILL BE DELIVERED FROM TRAVELING VEHICLE SC |
| | | SALES TAX | ¥26 | |
| | | AMOUNT TO BE PAID | ¥361 | |

( PROCEED TO PAYMENT SCREEN )

ORDERED ITEMS CONFIRMATION SCREEN

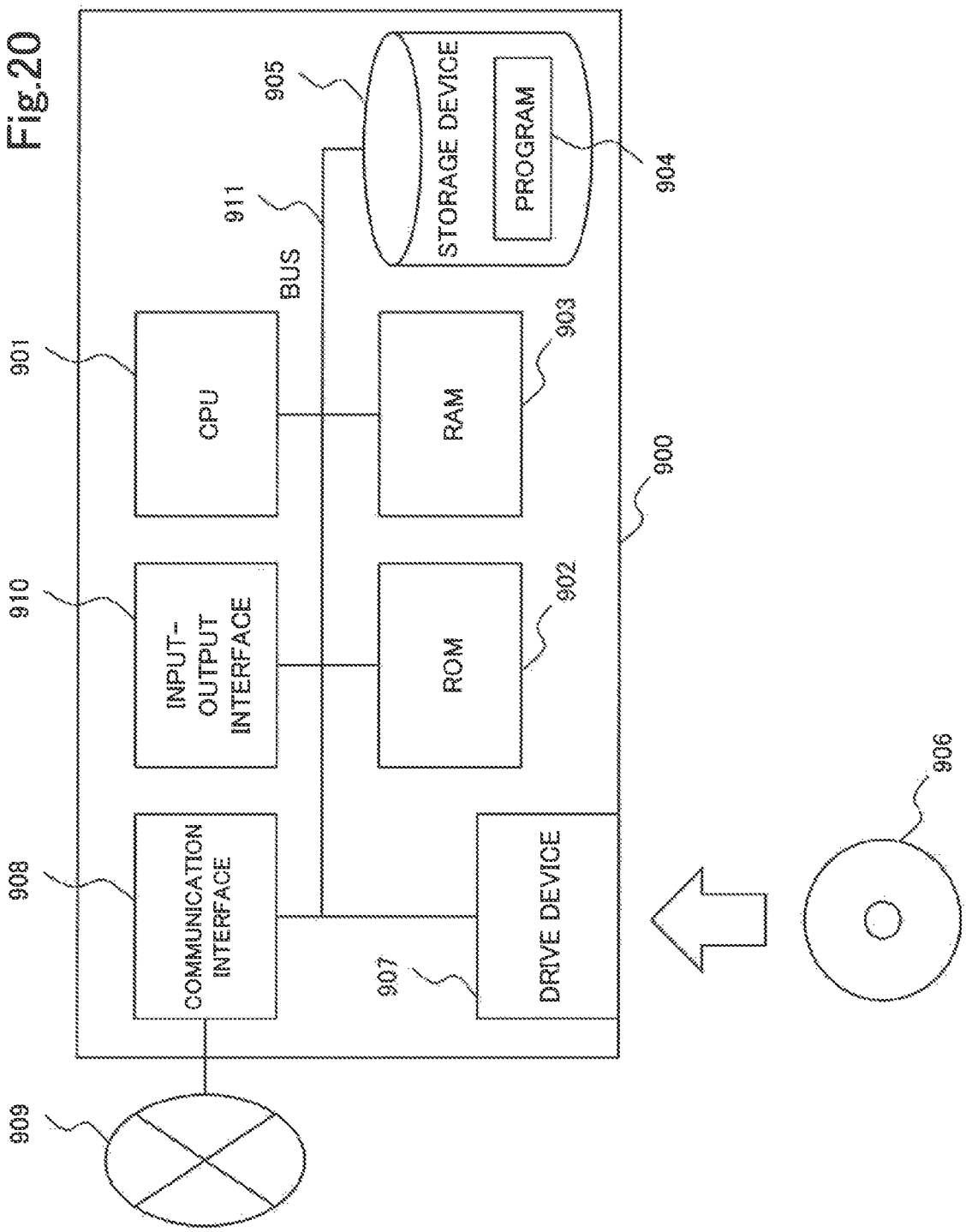

DELIVERY ASSISTANCE DEVICE, CUSTOMER TERMINAL, AND DELIVERY ASSISTANCE METHOD

This application is a National Stage Entry of PCT/JP2017/029880 filed on Aug. 22, 2017, which claims priority from Japanese Patent Application 2016-162594 filed on Aug. 23, 2016, the contents of all of which are incorporated herein by reference, in their entirety.

TECHNICAL FIELD

The present disclosure relates to a delivery assistance device, a customer terminal, an item sales system, a delivery assistance method, a display control method, and a recording medium.

BACKGROUND ART

There are an increasing number of customers doing online shopping to purchase an item through the Internet. Further, an item sales method called a mobile supermarket using a mobile sales vehicle has been proposed (NPL 1).

As a technology of combining the above, a technology of ordering, through a network, an item being sold by a mobile sales vehicle and purchasing the ordered item at a mobile sales vehicle is disclosed (PTL 1 and PTL 2).

CITATION LIST

Patent Literature

PTL 1: Japanese Unexamined Patent Application Publication No. 2011-221984

Non Patent Literature

NPL 1: "Mobile Supermarket Tokushimaru," [online], [retrieved on Jul. 13, 2016], retrieved from the Internet: <http://www.tokushimaru.jp/>

SUMMARY OF INVENTION

Technical Problem

Item purchase by online shopping takes at least several hours from ordering of an item to delivery to the purchaser, and therefore it takes a long time for actual delivery after ordering. However, in the case of item purchase by online shopping, for example, there is a benefit that a customer staying indoors can receive an item without going outdoors. Accordingly, shortening of the time required for delivery is sought in purchase of an item by online shopping.

An object of the present disclosure is to provide a technology enabling shortening of the time required for delivery in purchase of an item by online shopping.

Solution to Problem

A delivery assistance device according to one aspect of the present disclosure includes:
management means for managing stock information about stock of an item held by each of a plurality of traveling vehicles;
first reception means for receiving, from each of the plurality of traveling vehicles, current position information indicating a current position of the traveling vehicle;
first transmission means for transmitting the stock information to a customer terminal;
second reception means for receiving, from the customer terminal, order information including information about an item ordered based on the stock information and delivery address information indicating a delivery address of the item;
specification means for specifying a traveling vehicle arriving earliest at the delivery address out of one or more of the traveling vehicles holding the ordered item, based on the current position of the traveling vehicle indicated by the current position information and the position of the delivery address indicated by the delivery address information; and
second transmission means for transmitting the order information to the specified traveling vehicle, wherein
the management means updates the stock information about stock of an item held by the specified traveling vehicle, based on the order information.

A customer terminal according to one aspect of the present disclosure includes:
transmission means for transmitting, to a delivery assistance device managing stock information about stock of an item held by each of a plurality of traveling vehicles, order information including information about an item ordered based on the stock information transmitted from the delivery assistance device and delivery address information indicating a delivery address of an item;
reception means for receiving an estimated arrival time at which a traveling vehicle arrives at the delivery address, the traveling vehicle being specified arriving earliest at the delivery address out of one or more of the traveling vehicles holding the ordered item based on a current position of the traveling vehicle and a position of the delivery address indicated by the delivery address information; and
display control means for causing a display device to display the estimated arrival time.

An item sales system according to one aspect of the present disclosure includes:
a delivery assistance device;
an on-board device being loaded on each of a plurality of traveling vehicles and transmitting current position information indicating a current position of each of the plurality of traveling vehicles to the delivery assistance device; and
one or more customer terminals, wherein
the delivery assistance device includes:
management means for managing stock information about stock of an item held by each of the plurality of traveling vehicles;
first reception means for receiving the current position information;
first transmission means for transmitting the stock information to a customer terminal;
second reception means for receiving, from the customer terminal, order information including information about an item ordered based on the stock information and delivery address information indicating a delivery address of the item;
specification means for specifying a traveling vehicle arriving earliest at the delivery address out of one or more of the traveling vehicles holding the ordered item, based on a current position of the traveling vehicle indicated by the current position information and a position of the delivery address indicated by the delivery address information; and
second transmission means for transmitting the order information to an on-board device loaded on the specified traveling vehicle, wherein the management means updates the stock information about stock of an item held by the specified traveling vehicle, based on the order information.

A delivery assistance method according to one aspect of the present disclosure includes:

managing stock information about stock of an item held by each of a plurality of traveling vehicles;

receiving, from each of the plurality of traveling vehicles, current position information indicating a current position of the traveling vehicle;

transmitting the stock information to a customer terminal;

receiving, from the customer terminal, order information including information about an item ordered based on the stock information;

receiving delivery address information indicating a delivery address of the item from the customer terminal;

specifying a traveling vehicle arriving earliest at the delivery address out of one or more of the traveling vehicles holding the ordered item, based on a current position of the traveling vehicle indicated by the current position information and a position of the delivery address indicated by the delivery address information;

transmitting the order information to the specified traveling vehicle; and updating the stock information about stock of an item held by the specified traveling vehicle, based on the order information.

A display control method according to one aspect of the present disclosure includes:

receiving stock information from a delivery assistance device managing the stock information about stock of an item held by each of a plurality of traveling vehicles;

transmitting, to the delivery assistance device, order information including information about an item ordered based on the stock information and delivery address information indicating a delivery address of the item;

receiving an estimated arrival time at which a traveling vehicle arrives at the delivery address, the traveling vehicle being specified arriving earliest at the delivery address out of one or more of the traveling vehicles holding the ordered item based on a current position of the traveling vehicle and a position of the delivery address indicated by the delivery address information; and causing a display device to display the estimated arrival time.

A delivery assistance method in an item sales system including a delivery assistance device, an on-board device loaded on each of a plurality of traveling vehicles, and one or more customer terminals, the delivery assistance method according to one aspect of the present disclosure includes:

managing, by the delivery assistance device, stock information about stock of an item held by each of the plurality of traveling vehicles;

transmitting, by the on-board device, current position information indicating a current position of a traveling vehicle loaded with the on-board device;

receiving, by the delivery assistance device, the current position information;

transmitting, by the delivery assistance device, the stock information to a customer terminal;

transmitting, by the customer terminal, to the delivery assistance device, order information including information about an item ordered based on the stock information received from the delivery assistance device and delivery address information indicating a delivery address of the item;

receiving, by the delivery assistance device, the order information and the delivery address information from the customer terminal;

specifying, by the delivery assistance device, a traveling vehicle arriving earliest at the delivery address out of one or more of the traveling vehicles holding the ordered item, based on a current position of the traveling vehicle indicated by the current position information and a position of the delivery address indicated by the delivery address information;

transmitting, by the delivery assistance device, the order information to an on-board device loaded on the specified traveling vehicle; and updating, by the delivery assistance device, the stock information about stock held by the specified traveling vehicle, based on the order information.

A computer program implementing the delivery assistance devices, the customer terminal, the item sales system or the respective methods described above with a computer, and a computer-readable non-transitory recording medium storing the computer program are also included in the scope of the present disclosure.

Advantageous Effects of Invention

The present disclosure can shorten the time required for delivery in purchase of an item by online shopping.

BRIEF DESCRIPTION OF DRAWINGS

FIG. 10 is a diagram illustrating an example of stock information stored by a stock information storage unit according to the second example embodiment.

FIG. 11 is a diagram illustrating an example of customer information stored by a customer information storage unit according to the second example embodiment.

FIG. 16 is a diagram illustrating an example of an ordering screen displayed by a display unit.

FIG. 18 is a diagram illustrating an example of an ordered items confirmation screen displayed by a display unit.

FIG. 20 is a diagram exemplarily illustrating a hardware configuration of a computer (information processing device) capable of implementing the respective example embodiments.

EXAMPLE EMBODIMENT

First Example Embodiment

Figure 1:
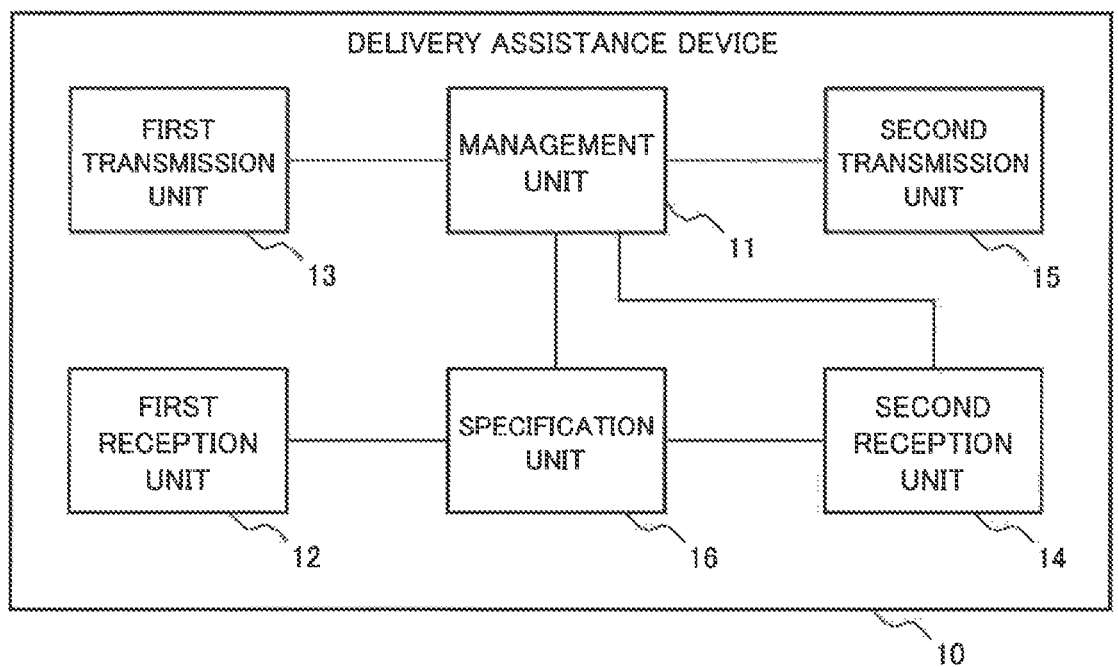
FIG. 1 is a functional block diagram illustrating a functional configuration example of a delivery assistance device according to a first example embodiment.

A first example embodiment of the present disclosure will be described with reference to drawings. A delivery assistance device 10 managing stock information about stock of an item held by each of a plurality of traveling vehicles will be described in the present example embodiment. A traveling vehicle moves in accordance with a predetermined traveling route and receives an order for an item loaded on the traveling vehicle through a network while moving. Then, based on the received order, the traveling vehicle delivers the item to a customer placing the order. FIG. 1 is a functional block diagram illustrating a functional configuration example of the delivery assistance device 10 according to the present example embodiment. As illustrated in FIG. 1, the delivery assistance device 10 according to the present example embodiment includes a management unit 11, a first reception unit 12, a first transmission unit 13, a second reception unit 14, a second transmission unit 15, and a specification unit 16.

The management unit 11 manages stock information about stock of an item held by each of a plurality of traveling vehicles. The stock information includes at least information (for example, an item name and an item identifier) for identifying an item held by each of the plurality of traveling vehicles and a quantity of the item. The management unit 11 manages stock information for each traveling vehicle. The stock information managed by the management unit 11 may be stored in a storage unit provided inside the delivery assistance device 10 or may be stored in a storage device separate from the delivery assistance device 10. The management unit 11 provides the first transmission unit 13 with the managed stock information.

Further, the management unit 11 updates stock information about stock of an item held by a traveling vehicle specified by the specification unit 16, to be described later, based on order information received by the second reception unit 14.

The first reception unit 12 receives, from each of a plurality of traveling vehicles, current position information indicating a current position of the traveling vehicle. The first reception unit 12 provides the specification unit 16 with the received current position information.

The first transmission unit 13 transmits stock information managed by the management unit 11 to a customer terminal.

The second reception unit 14 receives, from a customer terminal to which stock information is transmitted by the first transmission unit 13, order information including information about an item ordered based on the stock information. The information about an ordered item included in the order information includes at least information for identifying a customer ordering the item, information (for example, an item name and an item identifier) for identifying the ordered item included in stock information managed by the management unit 11, and a quantity of the item. The second reception unit 14 provides the management unit 11 with the received order information.

Further, when receiving delivery address information indicating a delivery address of an item from a customer terminal, the second reception unit 14 provides the specification unit 16 with the received delivery address information.

The specification unit 16 receives current position information from the first reception unit 12. Further, the specification unit 16 receives delivery address information from the second reception unit 14. The specification unit 16 receives information indicating a traveling vehicle holding an item included in order information from the management unit 11. Then, the specification unit 16 specifies a traveling vehicle arriving earliest at a delivery address out of one or more traveling vehicles holding the ordered item, based on a current position of a traveling vehicle indicated by the current position information and a position of the delivery address indicated by the delivery address information. The specification unit 16 provides the management unit 11 with information indicating the specified traveling vehicle.

The second transmission unit 15 transmits order information along with delivery address information to a traveling vehicle holding an ordered item included in order information. Specifically, the second transmission unit 15 receives information indicating a traveling vehicle holding the ordered item included in the order information along with the order information from the management unit 11 and transmits the order information along with the delivery address information to the traveling vehicle.

Figure 2:
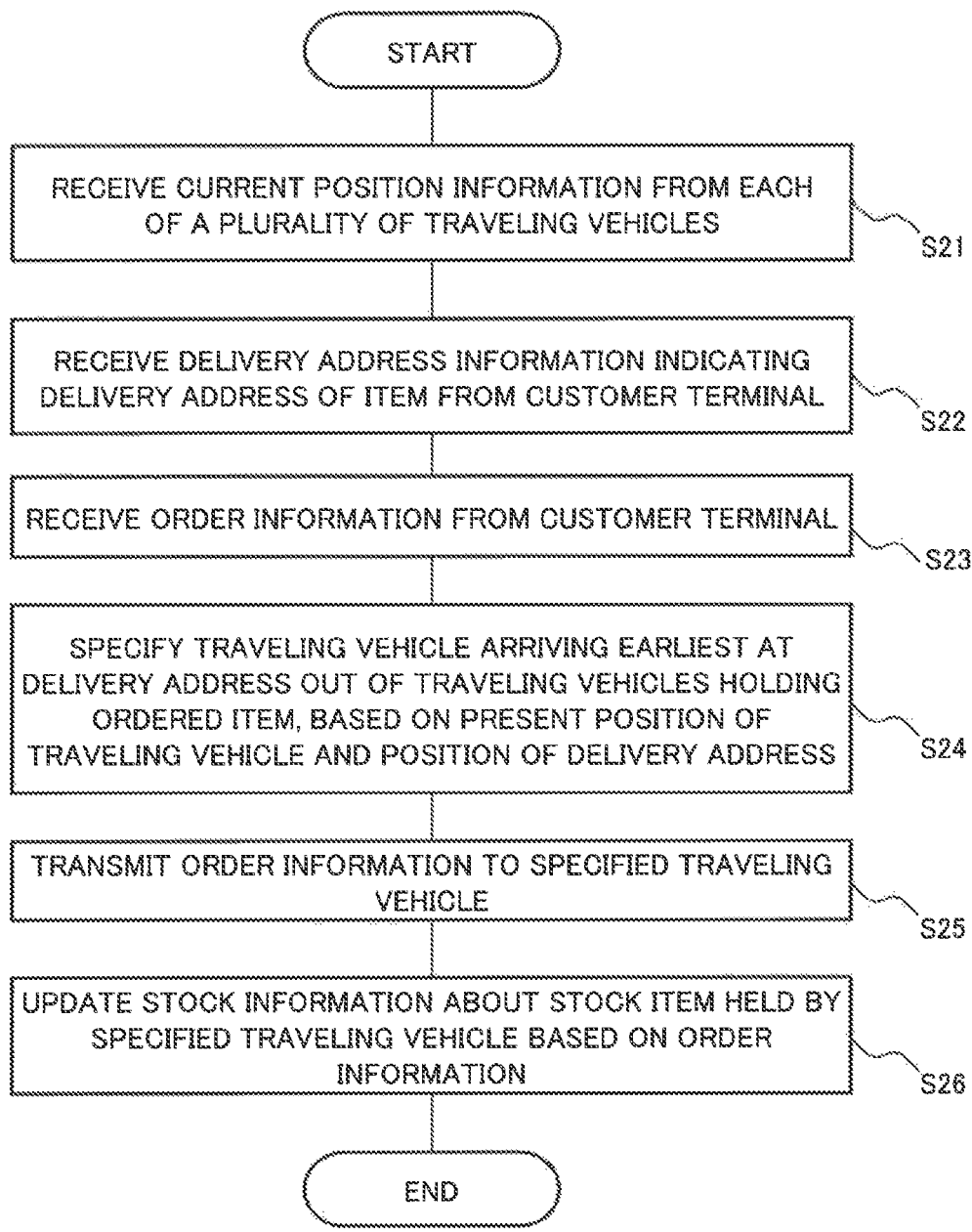
FIG. 2 is a flowchart illustrating an example of a processing flow in the delivery assistance device according to the first example embodiment.

Next, a processing flow in the delivery assistance device 10 according to the present example embodiment will be described with reference to FIG. 2. FIG. 2 is a flowchart illustrating an example of a processing flow in the delivery assistance device 10 according to the present example embodiment. It is assumed in FIG. 2 that the management unit 11 in the delivery assistance device 10 manages stock information about stock of items held by a plurality of traveling vehicles for each traveling vehicle. It is further assumed that the first transmission unit 13 in the delivery assistance device 10 has transmitted the stock information to a customer terminal.

As illustrated in FIG. 2, first, the first reception unit 12 in the delivery assistance device 10 receives, from each of a plurality of traveling vehicles, current position information indicating a current position of the traveling vehicle (Step S21).

Further, the second reception unit 14 receives delivery address information indicating a delivery address of an item from a customer terminal (Step S22). Further, the second reception unit 14 receives order information from a customer terminal (Step S23). Steps S21 to S23 may be performed in any order.

When Steps S21 to S23 end, the specification unit 16 specifies a traveling vehicle arriving earliest at a delivery address out of one or more traveling vehicles holding an ordered item, based on a current position of a traveling vehicle indicated by the current position information and a position of the delivery address indicated by the delivery address information (Step S24).

Then, the second transmission unit 15 transmits the order information along with the delivery address information to the traveling vehicle specified in Step S24 (Step S25).

Further, based on the order information, the management unit 11 updates stock information about stock of an item held by the traveling vehicle specified in Step S24 (Step S26).

The above concludes the processing by the delivery assistance device 10.

As described above, the management unit 11 updates stock information, based on order information received by the second reception unit 14. Consequently, an item held by a traveling vehicle can be sold on an online shop.

Further, the specification unit 16 specifies a traveling vehicle arriving earliest at a delivery address out of one or more traveling vehicles holding an ordered item, based on a current position of a traveling vehicle indicated by current position information and a position of the delivery address indicated by delivery address information. Then, the second transmission unit 15 transmits order information to the specified traveling vehicle. Consequently, a driver of the traveling vehicle receiving the order information can deliver the item held by the traveling vehicle to a customer placing the order.

Consequently, a customer doing online shopping by use of a customer terminal can more quickly receive an item which the customer wants. Accordingly, the delivery assistance device 10 according to the present example embodiment can shorten the time required for delivery in purchase of an item by online shopping.

Figure 3:
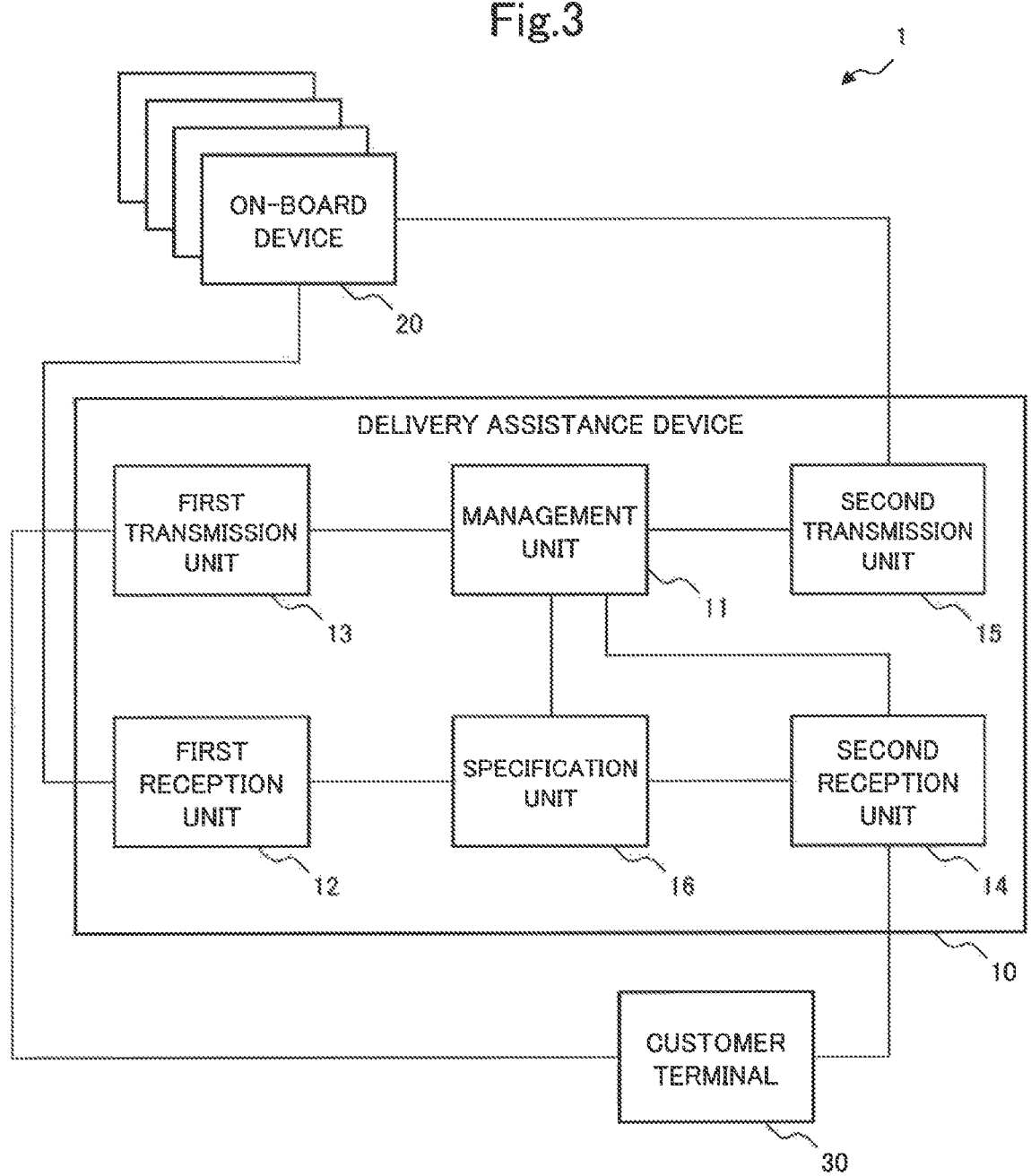
FIG. 3 is a functional block diagram illustrating a functional configuration example of an item sales system including the delivery assistance device according to the first example embodiment.

Further, an item sales system 1 including the delivery assistance device 10 according to the present example embodiment will be described with reference to FIG. 3. FIG. 3 is a functional block diagram illustrating a functional configuration example of the item sales system 1 including the delivery assistance device 10 according to the present example embodiment. As illustrated in FIG. 3, the item sales system 1 includes a delivery assistance device 10, a plurality of on-board devices 20, and one or a plurality of customer terminals 30. The delivery assistance device 10 included in FIG. 3 has a configuration similar to that of the delivery assistance device 10 described by use of FIG. 1.

An on-board device 20 is loaded on each of the plurality of traveling vehicles. An on-board device 20 transmits current position information indicating a current position of a traveling vehicle to the delivery assistance device 10. Then, a first reception unit 12 in the delivery assistance device 10 receives the current position information.

Further, a first transmission unit 13 transmits stock information to a customer terminal 30.

A second reception unit 14 in the delivery assistance device 10 receives order information and delivery address information from a customer terminal 30. Then, a specification unit 16 in the delivery assistance device 10 specifies a traveling vehicle arriving earliest at a delivery address out of one or more traveling vehicles holding an ordered item, based on a current position of a traveling vehicle indicated by current position information and a position of the delivery address indicated by the delivery address information.

A management unit 11 in the delivery assistance device 10 updates stock information of a traveling vehicle specified by the specification unit 16, based on order information received by the second reception unit 14.

Further, a second transmission unit 15 transmits order information to an on-board device 20 on a traveling vehicle specified by the specification unit 16, the traveling vehicle holding an ordered item included in the order information.

Figure 4:
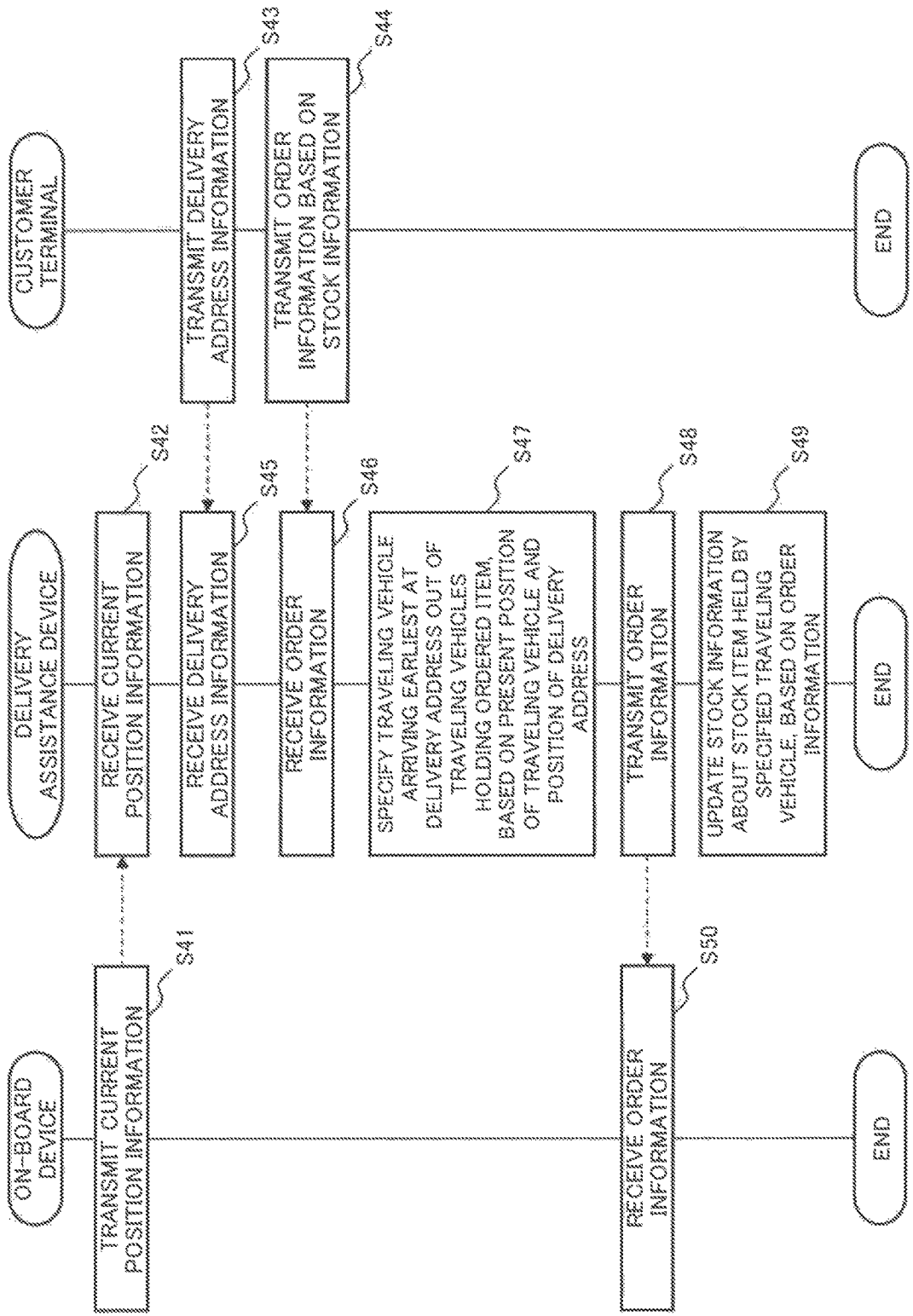
FIG. 4 is a flowchart illustrating an example of a processing flow in the item sales system including the delivery assistance device according to the first example embodiment.

Next, a processing flow in the item sales system 1 including the delivery assistance device 10 according to the present example embodiment will be described with reference to FIG. 4. FIG. 4 is a flowchart illustrating an example of a processing flow in the item sales system 1 including the delivery assistance device 10 according to the present example embodiment. It is assumed in FIG. 4 that the management unit 11 in the delivery assistance device 10 manages stock information about stock of an item held by a plurality of traveling vehicles for each traveling vehicle. It is further assumed that the first transmission unit 13 in the delivery assistance device 10 has transmitted the stock information to a customer terminal.

Further, in FIG. 4, processing by an on-board device 20 is described on the left, processing by the delivery assistance device 10 at the center, and processing by a customer terminal 30 on the right; and a broken arrow between the respective processing steps indicates a flow of primary information. An information flow is not limited to a direction of an arrow, and for example, an ACKnowledgement (ACK) may be transmitted in a direction reverse to the arrow.

As indicated in FIG. 4, an on-board device 20 transmits current position information indicating a current position of a traveling vehicle loaded with the on-board device 20 to the delivery assistance device 10 (Step S41). Then, the first reception unit 12 in the delivery assistance device 10 receives the current position information (Step S42).

Further, the transmission unit 31 in a customer terminal 30 transmits delivery address information indicating a delivery address of an item (Step S43). Furthermore, the transmission unit 31 transmits order information including information about an item ordered based on the stock information (Step S44). An execution order of Steps S41, S43, and S44 is not particularly limited.

Then, the second reception unit 14 in the delivery assistance device 10 receives the delivery address information indicating the delivery address of an item from the customer terminal 30 (Step S45). Further, the second reception unit 14 receives the order information from the customer terminal (Step S46).

Then, the specification unit 16 specifies a traveling vehicle arriving earliest at the delivery address out of one or more traveling vehicles holding the ordered item, based on a current position of a traveling vehicle indicated by current position information and a position of the delivery address indicated by the delivery address information (Step S47).

Then, the second transmission unit 15 transmits the order information along with the delivery address information to an on-board device 20 on the traveling vehicle specified in Step S47 (Step S48). Then, the management unit 11 updates stock information about stock of an item held by the specified traveling vehicle, based on the order information (Step S49).

When Step S48 ends, the on-board device 20 receives the order information (Step S50).

When an item is ordered by a customer using a customer terminal 30, Step S43 is executed again in the item sales system 1. Thus, the delivery assistance device 10 executes the processing in the flowchart illustrated in FIG. 4 every time a customer purchases an item.

As described above, the management unit 11 updates stock information, based on order information received by the second reception unit 14. Consequently, an item held by a traveling vehicle can be sold by using an online shop allowing online shopping.

Further, the specification unit 16 specifies a traveling vehicle arriving earliest at a delivery address out of one or more traveling vehicles holding an ordered item, based on a current position of a traveling vehicle indicated by current position information and a position of the delivery address indicated by delivery address information. Then, the second transmission unit 15 transmits order information to an on-board device 20 on the specified traveling vehicle. Consequently, a driver of the traveling vehicle receiving the order information can deliver the item held by the traveling vehicle to a customer placing the order.

Accordingly, the item sales system 1 including the delivery assistance device 10 according to the present example embodiment can shorten the time required for delivery in purchase of an item by online shopping.

The delivery assistance device 10 described above may be configured to estimate an arrival time at which a specified traveling vehicle arrives at a delivery address and transmit the estimated arrival time to a customer terminal.

Figure 5:
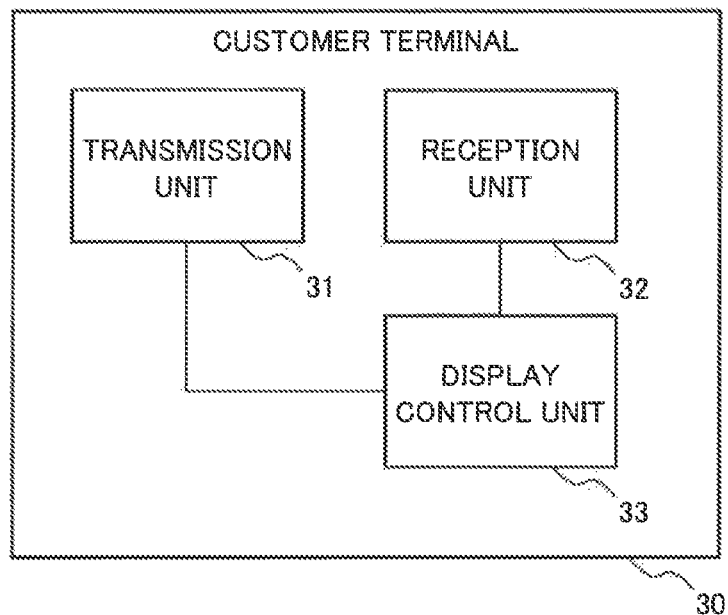
FIG. 5 is a functional block diagram illustrating a functional configuration example of a customer terminal communicating with the delivery assistance device according to the first example embodiment.
Figure 6:
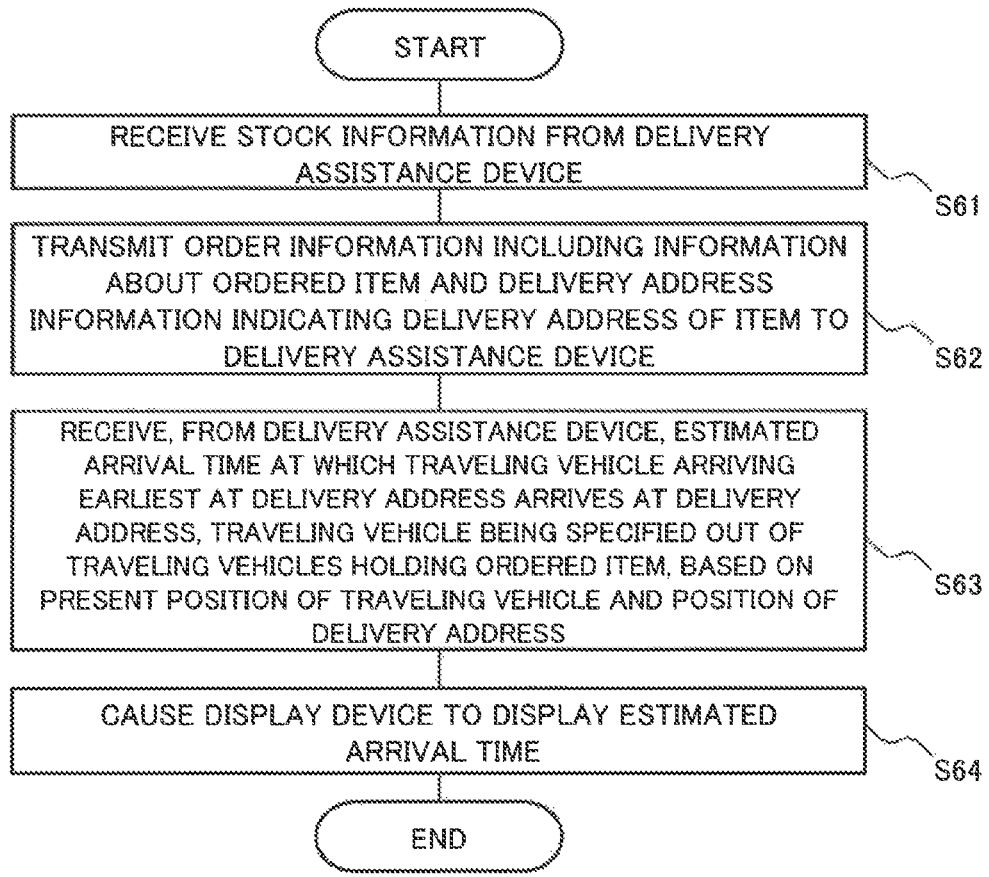
FIG. 6 is a flowchart illustrating an example of a processing flow in the customer terminal communicating with the delivery assistance device according to the first example embodiment.

A customer terminal 30 thus receiving an estimated arrival time from the delivery assistance device 10 will be described by use of FIGS. 5 and 6. FIG. 5 is a functional block diagram illustrating a functional configuration example of a customer terminal 30 communicating with the delivery assistance device 10 according to the present example embodiment.

As illustrated in FIG. 5, the customer terminal 30 includes a transmission unit 31, a reception unit 32, and a display control unit 33. The transmission unit 31 transmits, to the aforementioned delivery assistance device 10, order information including information about an item ordered based on stock information transmitted from the delivery assistance device 10 and delivery address information indicating a delivery address of the item.

The reception unit 32 receives an estimated arrival time from the aforementioned delivery assistance device 10. An estimated arrival time is a time at which a traveling vehicle arriving earliest at a delivery address is to arrive at the delivery address, the traveling vehicle being specified out of one or more traveling vehicles holding the ordered item, based on a current position of the traveling vehicle indicated by current position information and a position of the delivery address indicated by delivery address information. The reception unit 32 provides the display control unit 33 with the received estimated arrival time.

The display control unit 33 causes a display device to display the estimated arrival time.

Next, a processing flow in a customer terminal 30 will be described with reference to FIG. 6. FIG. 6 is a flowchart illustrating an example of a processing flow in a customer terminal 30 communicating with the delivery assistance device 10 according to the present example embodiment.

The reception unit 32 receives stock information from the delivery assistance device 10 managing stock information about stock of items held by each of a plurality of traveling vehicles (Step S61). Then, when an order is placed for an item by a customer based on the stock information, order information including information about the ordered item and delivery address information indicating a delivery address of the item are transmitted to the delivery assistance device 10 (Step S62). The delivery address of the item may be input by the customer or may be preset.

Then, the reception unit 32 receives, from the delivery assistance device 10, an estimated arrival time at which a traveling vehicle arriving earliest at the delivery address will arrive at the delivery address, the traveling vehicle being specified out of one or more traveling vehicles holding the ordered item, based on a current position of a traveling vehicle and a position of the delivery address (Step S63). Then, the display control unit 33 causes the display device to display the estimated arrival time (Step S64).

The above concludes the processing by the customer terminal 30.

As described above, the customer terminal 30 can display a time at which a traveling vehicle arriving earliest at a delivery address is to arrive at the delivery address on the display device. Accordingly, a customer can readily understand when an ordered item arrives.

Second Example Embodiment

Figure 7:
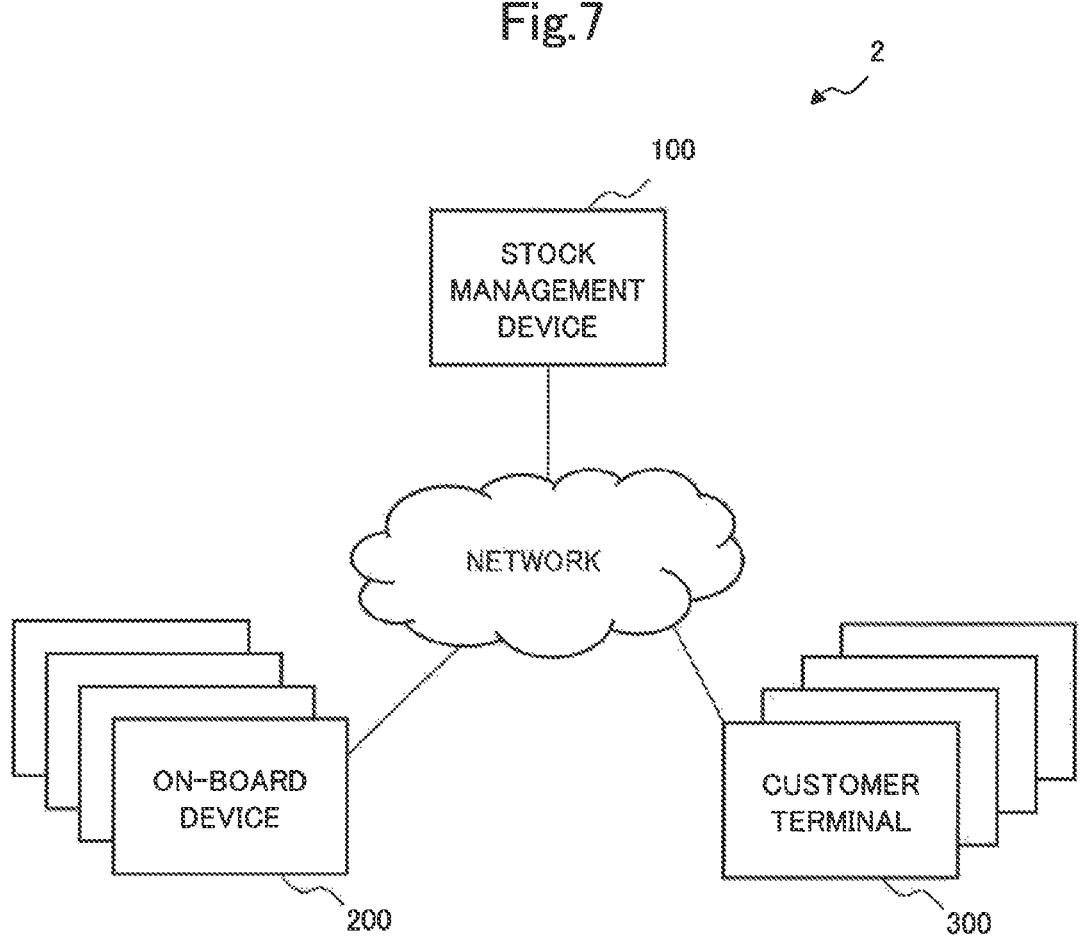
FIG. 7 is a block diagram illustrating a configuration example of an item sales system according to a second example embodiment.

Next, a second example embodiment of the present disclosure based on the aforementioned first example embodiment will be described with reference to drawings. First, FIG. 7 illustrates a configuration example of an item sales system 2 according to the present example embodiment. As illustrated in FIG. 7, the item sales system 2 according to the present example embodiment includes a delivery assistance device 100, a plurality of on-board devices 200, and one or a plurality of customer terminals 300. The delivery assistance device 100 communicates with on-board devices 200 and customer terminals 300 through a network. A customer terminal 300 may be a mobile terminal or may be a desktop terminal.

Figure 8:
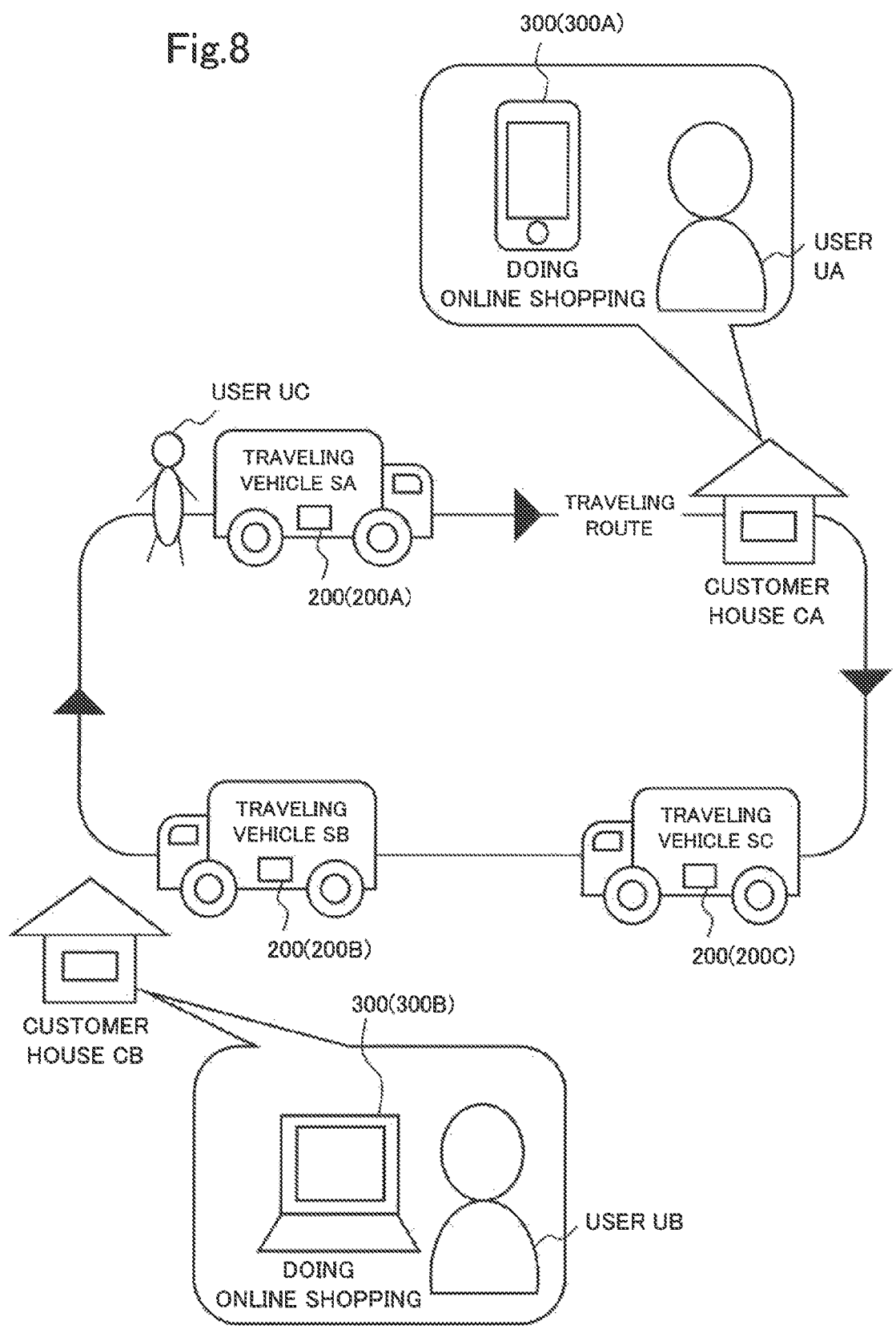
FIG. 8 is a diagram for illustrating a use scene of the item sales system according to the second example embodiment.

FIG. 8 is a diagram for illustrating a use scene of the item sales system 2 according to the present example embodiment. An on-board device 200 included in the item sales system 2 is a device loaded on each of the plurality of traveling vehicles. While FIG. 8 illustrates three traveling vehicles (SA, SB, SC), a number of traveling vehicles has only to be two or more. Further, while an on-board device 200 loaded on the traveling vehicle SA is referred to as an on-board device 200A, an on-board device 200 loaded on the traveling vehicle SB is referred to as an on-board device 200B, and an on-board device 200 loaded on the traveling vehicle SC is referred to as an on-board device 200C, the devices are simply referred to as on-board devices 200 when the devices are not distinguished or are referred to by a generic name.

For example, each of the traveling vehicles (SA, SB, SC) travels in accordance with a predetermined traveling route and delivers an item loaded on the traveling vehicle to a customer, based on order information transmitted from the delivery assistance device 100. Traveling routes according to which the plurality of traveling vehicles (SA, SB, SC) travel may be identical, different, or partially overlapping one another.

It is assumed that a user UA living in a customer house CA is a customer doing online shopping by use of a customer terminal 300A. It is further assumed that a user UB living in a customer house CB is a customer doing online shopping by use of a customer terminal 300B. The customer terminal 300A and the customer terminal 300B are simply referred to as customer terminals 300 when the terminals are not distinguished or referred to by a general name. The customer house CA and the customer house CB may be houses facing roads on the traveling routes of the traveling vehicles (SA, SB, SC) or may be houses within a predetermined range from the traveling routes, respectively.

A store providing a service allowing a customer to do online shopping is hereinafter referred to as an online shop.

By the delivery assistance device 100 communicating with on-board devices 200 and customer terminals 300, the item sales system 2 according to the present example embodiment delivers an item held by a traveling vehicle to a customer doing online shopping from the traveling vehicle loaded with an on-board device 200.

Figure 9:
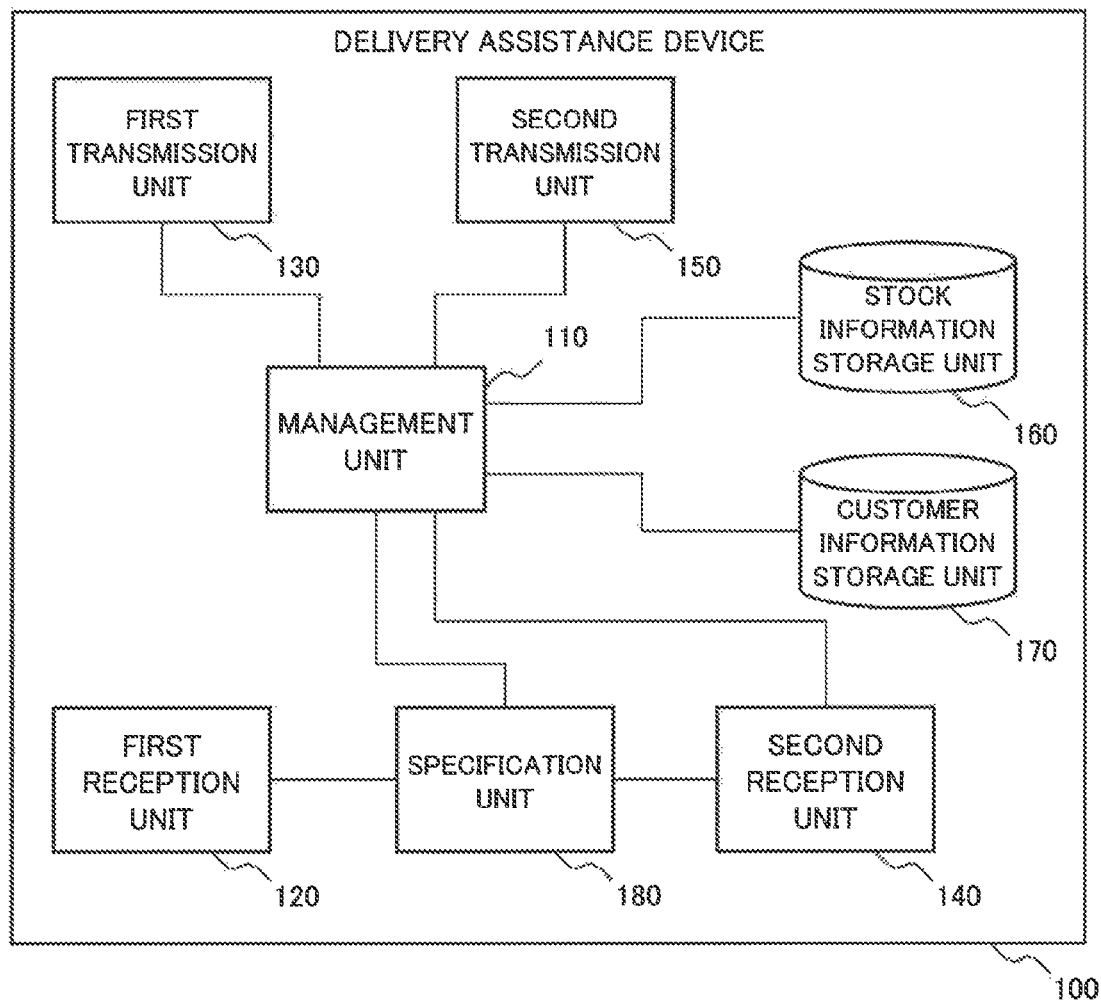
FIG. 9 is a functional block diagram illustrating a functional configuration example of a delivery assistance device in the item sales system according to the second example embodiment.

Next, a function of each device in the item sales system 2 according to the present example embodiment will be described in detail. FIG. 9 is a functional block diagram illustrating a functional configuration example of the delivery assistance device 100 in the item sales system 2 according to the present example embodiment. As illustrated in FIG. 9, the delivery assistance device 100 includes a management unit 110, a first reception unit 120, a first transmission unit 130, a second transmission unit 140, a second transmission unit 150, a stock information storage unit 160, a customer information storage unit 170, and a specification unit 180.

The stock information storage unit 160 stores stock information being information indicating stock of items held by each of a plurality of traveling vehicles. The stock information stored by the stock information storage unit 160 will be described with reference to FIG. 10. FIG. 10 is a diagram illustrating an example of stock information stored by the stock information storage unit 160 according to the present example embodiment. The stock information includes at least an item name being information for identifying an item held by each of a plurality of traveling vehicles, and a quantity of an item represented by the item name for each traveling vehicle. The stock information may include a unit price, as illustrated in FIG. 10. Information included in the stock information is not limited to the above.

The customer information storage unit 170 stores customer information indicating information about a customer using an online shop. The customer information stored by the customer information storage unit 170 will be described with reference to FIG. 11. FIG. 11 is a diagram illustrating an example of customer information stored by the customer information storage unit 170 according to the present example embodiment. The customer information includes a customer IDentifier (ID) for identifying a customer, a name of the customer, an address of the customer, and a telephone number of the customer. The customer information is not limited to the above and may include other information. Further, the customer information has only to include information by which a delivery address of an item can be identified. Further, for example, the customer information may include authentication information used for logging into an online shop. The customer information may be pre-registered when a service provided by the item sales system 2 is used. The registration method of the customer information is not particularly limited.

The stock information storage unit 160 and the customer information storage unit 170 may be implemented as separate storage units or may be implemented as the same storage unit. Further, the stock information storage unit 160 and the customer information storage unit 170 may be implemented as a storage device separate from the delivery assistance device 100. Further, the stock information storage unit 160 and the customer information storage unit 170 may store stock information and customer information as databases, respectively.

The first reception unit 120 corresponds to the first reception unit 12 according to the first example embodiment. The first reception unit 120 receives, from each of a plurality of traveling vehicles, current position information indicating a current position of the traveling vehicle. The first reception unit 120 provides the specification unit 180 with the received current position information along with information (referred to as traveling vehicle information) indicating a traveling vehicle loaded with an on-board device 200 transmitting the current position information. Traveling vehicle information may be an identifier for identifying a traveling vehicle, a license plate number of the traveling vehicle, a vehicle identification number of the traveling vehicle, a traveling vehicle name, or the like.

The second reception unit 140 corresponds to the second reception unit 14 according to the first example embodiment. The second reception unit 140 receives, from a customer terminal 300, order information including information about an item ordered based on stock information transmitted to the customer terminal 300 by the first transmission unit 130, to be described later. Order information includes information for identifying a customer ordering an item, information (for example, an item name and an item identifier) for identifying the ordered item included in stock information managed by the management unit 110, and a quantity of the item. The second reception unit 140 provides the management unit 110 with the received order information.

Further, the second reception unit 140 receives delivery address information indicating a delivery address designated by a customer. Delivery address information has only to be information telling a position of a delivery address and a form of delivery address information is not particularly limited. For example, when a delivery address is an address of a customer registered in the customer information storage unit 170, the second reception unit 140 may receive a customer ID by which a delivery address can be specified, as delivery address information. When not receiving an instruction about a delivery address from a customer terminal 300, for example, the second reception unit 140 may determine the aforementioned customer ID being transmitted when online shopping is used as delivery address information. The second reception unit 140 provides the specification unit 180 with the received delivery address information along with information for specifying the customer terminal 300.

The management unit 110 corresponds to the management unit 11 according to the first example embodiment. The management unit 110 manages stock information stored in the stock information storage unit 160. Further, the management unit 110 manages customer information stored in the customer information storage unit 170. Further, the management unit 110 may manage order information. Order information may be stored and managed in a storage unit in the delivery assistance device 100.

Information about stock items loaded on a traveling vehicle before the items becoming purchasable on an online shop is registered in the stock information managed by the management unit 110. Then, the management unit 110 updates the stock information every time an item is purchased by online shopping and every time an item is carried in.

Further, the management unit 110 acquires, from the stock information storage unit 160, stock information to be transmitted to a customer terminal, and provides the first transmission unit 130 with the acquired stock information. At this time, the stock information acquired by the management unit 110 may be stock information about stock held by each of the traveling vehicle allowing a customer to purchase the items on an online shop at present, or may be stock information about stock held by traveling vehicles positioned within a predetermined range from a customer terminal, based on a position of the customer terminal. The traveling vehicle allowing a customer to purchase items on an online shop at present refers to, for example, a traveling vehicle capable of delivering an item held in the vehicle to a customer home at present, such as a traveling vehicle not being back in a garage or a traveling vehicle not all of items running out of stock. Further, for example, when a delivery address is designated by a customer terminal, the stock information acquired by the management unit 110 may be stock information about stock held by a traveling vehicle positioned within a predetermined range from the delivery address. Further, the stock information acquired by the management unit 110 may be stock information about stock held by a traveling vehicle predesignated by a customer.

Further, the management unit 110 specifies a traveling vehicle holding an item included in order information by referring to the stock information storage unit 160 and provides the specification unit 180 with information indicating the traveling vehicle.

Further, based on order information, the management unit 110 updates stock information about stock held by a traveling vehicle specified by the specification unit 180. For example, when a traveling vehicle specified by the specification unit 180 is the traveling vehicle SA, the management unit 110 updates stock information about stock of an item held by the traveling vehicle SA, based on order information. Further, the management unit 110 provides the second transmission unit 150 with order information received by the second reception unit 140 along with information indicating a traveling vehicle specified by the specification unit 180.

The specification unit 180 corresponds to the specification unit 16 according to the first example embodiment. The specification unit 180 receives current position information from the first reception unit 120. Further, the specification unit 180 receives delivery address information from the second reception unit 140. The specification unit 180 receives, from the management unit 110, information indicating a traveling vehicle holding an item included in order information. Then, the specification unit 180 specifies a traveling vehicle arriving earliest at a delivery address out of one or more traveling vehicles holding the ordered item, based on current positions of traveling vehicles each indicated by each pieces of the current position information and a position of the delivery address indicated by the delivery address information. The specification unit 180 may specify the traveling vehicle in consideration of scheduled traveling route information or the like. Scheduled traveling route information refers to information indicating a route on which a traveling vehicle is scheduled to travel. The scheduled traveling route information may be stored inside the delivery assistance device 100 or may be transmitted from an on-board device 200. Further, the specification unit 180 may specify the delivery vehicle in consideration of a traveling direction of a traveling vehicle, road information at the time, and the like. The traveling direction of a traveling vehicle and the road information may be transmitted from an on-board device 200. The road information may be information indicating a traffic jam and information preset to a road, such as one-way traffic. Further, the road information may be transmitted from an external server managing road information. The specification unit 180 provides the management unit 110 with information indicating the specified traveling vehicle.

Further, the specification unit 180 estimates an arrival time at which a specified traveling vehicle arrives at a delivery address, based on a current position of the specified traveling vehicle and a position of the delivery address. The specification unit 180 provides the first transmission unit 130 with the estimated arrival time through the management unit 110.

The specification unit 180 may specify a traveling vehicle after estimating an arrival time. Specifically, the specification unit 180 may estimate an arrival time at which each of one or more traveling vehicles holding an ordered item arrives at a delivery address and specify a traveling vehicle with the earliest estimated arrival time as a traveling vehicle arriving earliest at the delivery address. Thus, the specification unit 180 may perform specification of a traveling vehicle and estimation of an arrival time by the same method or by different methods.

The first transmission unit 130 corresponds to the first transmission unit 13 according to the first example embodiment. The first transmission unit 130 receives stock information from the management unit 110. The first transmission unit 130 transmits the stock information to a customer terminal 300. For example, when a browser is activated on a customer terminal 300, the first transmission unit 130 may generate a screen including stock information and transmit the generated screen to the customer terminal 300. Further, for example, when an application is activated on a customer terminal 300, the first transmission unit 130 may transmit information including stock information to the customer terminal 300 in such a way that the application can display a screen including the stock information. When a customer terminal 300 can display a screen including stock information, the first transmission unit 130 may transmit stock information itself acquired by the management unit 110. It is preferable that a timing at which the first transmission unit 130 transmits stock information to a customer terminal 300 be after detecting that a customer performs an operation for purchasing an item by use of the customer terminal 300. For example, detecting that a customer performs an operation for purchasing an item by use of the customer terminal 300 includes detecting that the delivery assistance device 100 has received login information from a customer terminal 300 by the customer inputting the login information to the customer terminal 300 for logging into an online shop. Consequently, the customer using the customer terminal 300 can confirm stock information at a timing of logging into the online shop.

Further, every time stock information is updated, the first transmission unit 130 may further transmit the updated stock information to a customer terminal 300. Consequently, a customer using the customer terminal 300 can confirm latest stock information at a time of an update.

Further, the first transmission unit 130 transmits, to a customer terminal 300, an estimated arrival time estimated by the specification unit 180, the estimated arrival time being a time at which a traveling vehicle is to arrive at a delivery address.

The second transmission unit 150 corresponds to the second transmission unit 15 according to the first example embodiment. The second transmission unit 150 transmits order information along with delivery address information to a traveling vehicle holding an ordered item included in the order information. The traveling vehicle holding an ordered item is a traveling vehicle specified by the specification unit 180.

Figure 12:
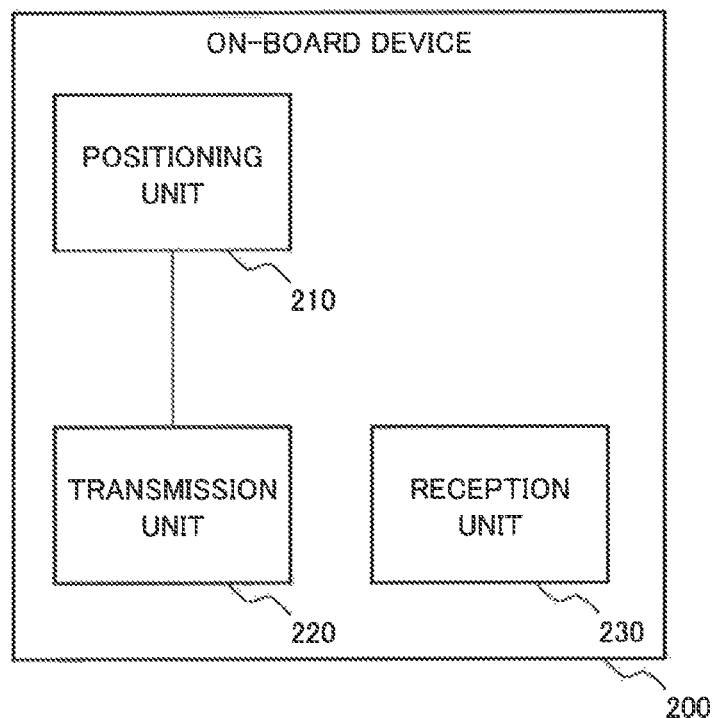
FIG. 12 is a functional block diagram illustrating a functional configuration example of an on-board device in the item sales system according to the second example embodiment.

Next, a functional configuration of an on-board device 200 will be described with reference to FIG. 12. FIG. 12 is a functional block diagram illustrating a functional configuration example of an on-board device 200 in the item sales system 2 according to the present example embodiment. The on-board device 200 includes a positioning unit 210, a transmission unit 220, and a reception unit 230.

For example, the positioning unit 210 receives positional information by use of the Global Positioning System (GPS), and from the received positional information, measures a current position of a traveling vehicle loaded with the on-board device 200. The means used for measuring a current position is not limited to the GPS. The positioning unit 210 may measure a current position by use of other information. The positioning unit 210 provides the transmission unit 220 with information (current position information) indicating a current position being a measurement result.

When receiving current position information from the positioning unit 210, the transmission unit 220 transmits the current position information to the delivery assistance device 100.

The reception unit 230 receives order information transmitted from the delivery assistance device 100 along with delivery address information. Consequently, based on the order information, a traveling vehicle loaded with the on-board device 200 receiving the order information can deliver an ordered item to a delivery address indicated by the delivery address information received along with the order information.

Figure 13:
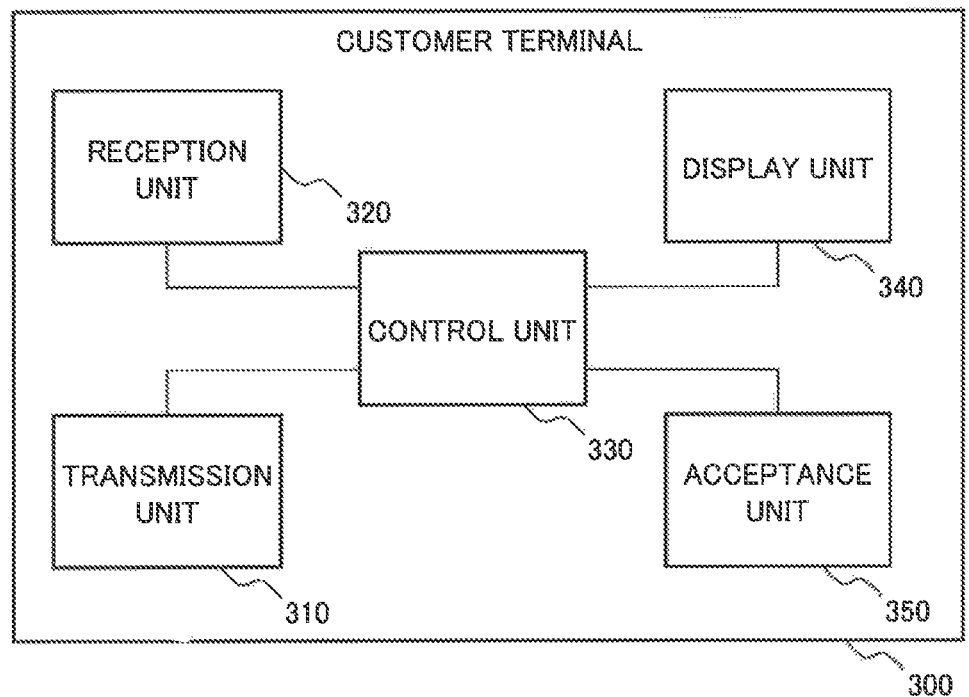
FIG. 13 is a functional block diagram illustrating a functional configuration example of a customer terminal in the item sales system according to the second example embodiment.

Next, a functional configuration of a customer terminal 300 will be described with reference to FIG. 13. FIG. 13 is a functional block diagram illustrating a functional configuration example of a customer terminal 300 in the item sales system 2 according to the present example embodiment. As illustrated in FIG. 13, the customer terminal 300 includes a transmission unit 310, a reception unit 320, a control unit (display control unit) 330, a display unit 340, and an acceptance unit 350.

The reception unit 320 corresponds to the reception unit 32 according to the first example embodiment. The reception unit 320 receives stock information from the delivery assistance device 100. The stock information has only to include information required for displaying information about stock held by a traveling vehicle on the display unit 340 and may be, for example, stock information itself stored in the stock information storage unit 160, part of the stock information, or processed stock information. The reception unit 320 provides the control unit 330 with the received stock information.

Further, the reception unit 320 receives an estimated arrival time from the delivery assistance device 100. An estimated arrival time is a time at which a traveling vehicle arriving earliest at a delivery address is to arrive at the delivery address, the traveling vehicle being specified out of one or more traveling vehicles holding an ordered item, based on current positions of the traveling vehicles each indicated by each pieces of current position information and a position of the delivery address indicated by delivery address information. The reception unit 320 provides the control unit 330 with the received scheduled time.

The display unit 340 displays a screen in accordance with an instruction by the control unit 330. For example, the display unit 340 is implemented with a liquid crystal display. The display unit 340 may be implemented with a display device separate from the customer terminal 300.

The acceptance unit 350 accepts an instruction from a user using the customer terminal 300. For example, the acceptance unit 350 accepts an instruction from a user input through an input device such as a mouse or a keyboard. The acceptance unit 350 provides the control unit 330 with the accepted instruction.

The acceptance unit 350 and the display unit 340 may be integrally formed as a touch panel.

The control unit 330 corresponds to the display control unit 33 according to the first example embodiment. The control unit 330 causes the display unit 340 to display a screen based on stock information received by the reception unit 320. Further, the control unit 330 causes the display unit 340 to display an estimated arrival time received by the reception unit 320.

Further, the control unit 330 provides the transmission unit 310 with order information including information about an item ordered by a customer.

The transmission unit 310 corresponds to the transmission unit 31 according to the first example embodiment. The transmission unit 310 transmits order information and delivery address information indicating a delivery address of an item. The delivery address information may be input by a customer.

Figure 14:
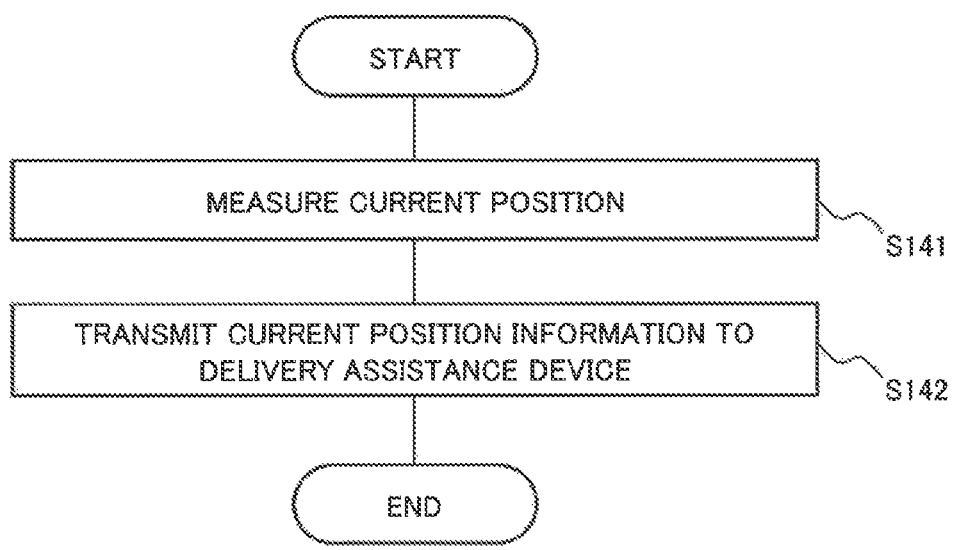
FIG. 14 is a flowchart illustrating an example of a flow of transmission processing of current position information by the on-board device in the item sales system according to the second example embodiment.

Next, transmission processing of current position information by an on-board device 200 will be described with reference to FIG. 14. FIG. 14 is a flowchart illustrating an example of a flow of the transmission processing of current position information by an on-board device 200 in the item sales system 2 according to the present example embodiment.

As described in FIG. 14, the positioning unit 210 measures a current position (Step S141). The positioning unit 210 provides current position information being the measurement result to the transmission unit 220. Then, the transmission unit 220 transmits the current position information to the delivery assistance device 100 (Step S142).

The above concludes the transmission processing of current position information by an on-board device 200.

Figure 15:
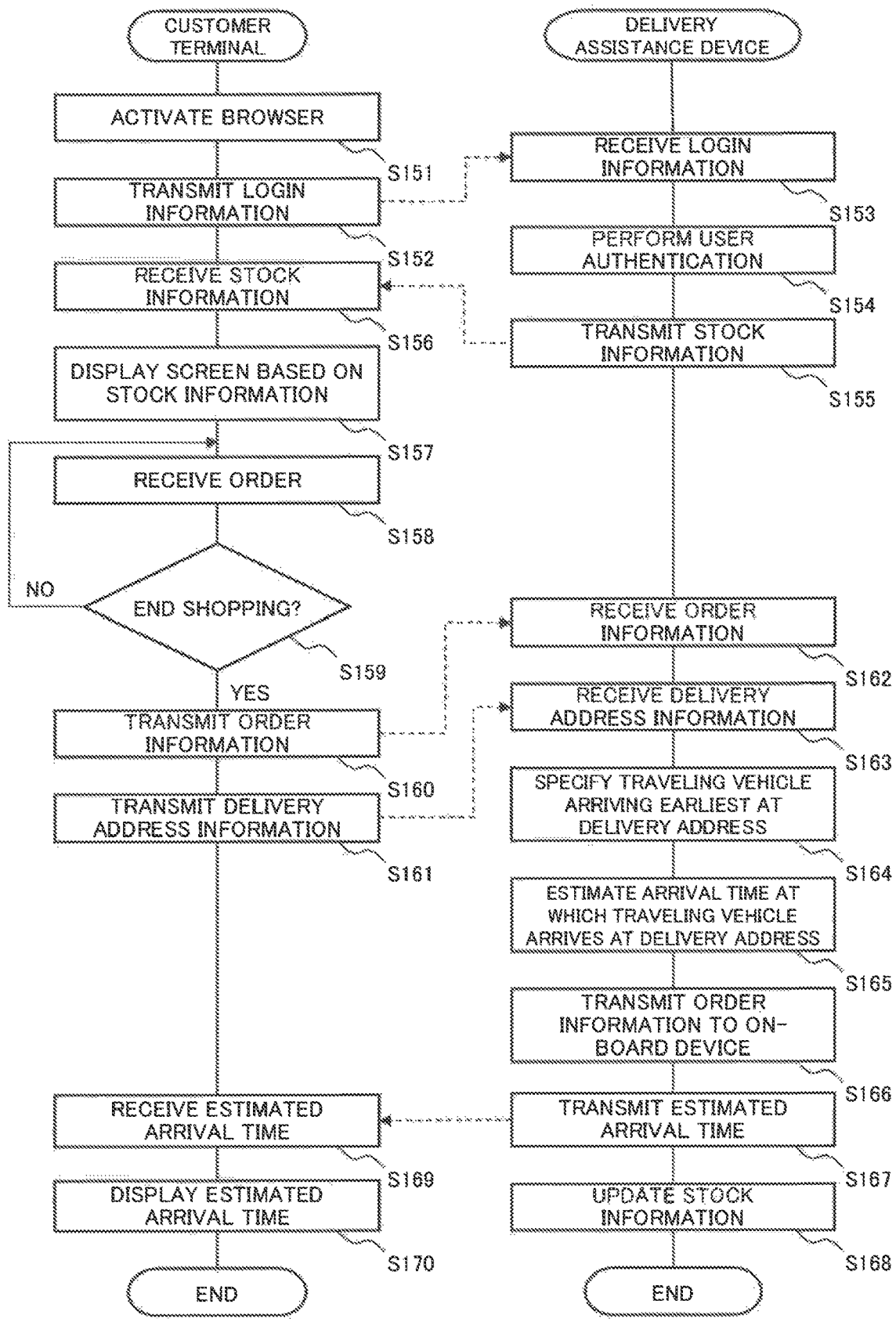
FIG. 15 is a flowchart illustrating an example of a flow of sales processing of an item by online shopping in the item sales system according to the second example embodiment.

Next, sales processing of an item by online shopping in the item sales system 2 will be described with reference to FIG. 15. FIG. 15 is a flowchart illustrating an example of a flow of the sales processing of an item by online shopping in the item sales system 2 according to the present example embodiment. The processing illustrated in FIG. 15 is performed asynchronously with the transmission processing of current position information illustrated in FIG. 14.

In FIG. 15, processing by a customer terminal 300 is described on the left, processing by the delivery assistance device 100 on the right. In FIG. 15, a broken arrow between the respective processing steps represents a flow of primary information. An information flow is not limited to a direction of an arrow, and for example, an ACK may be transmitted in a direction reverse to the arrow.

A user (customer) using a customer terminal 300 inputs an instruction to start online shopping into the customer terminal 300, and the acceptance unit 350 accepts a content of the instruction. For example, when an instruction to activate a browser is input in order to do online shopping, the control unit 330 activates the browser (Step S151). For example, when processing accepted by the acceptance unit 350 is an instruction to activate an application for doing online shopping, the control unit 330 activates the application installed on the customer terminal 300.

Then, the transmission unit 310 transmits information required for doing online shopping to the delivery assistance device 100. For example, the transmission unit 310 transmits to the delivery assistance device 100 login information, such as a customer ID and authentication information for logging into an online shop (Step S152). The login information may be input by a customer for each shopping.

When receiving the login information transmitted from the customer terminal 300 (Step S153), the second reception unit 140 in the delivery assistance device 100 transmits the login information to the management unit 110. Then, the management unit 110 refers to the customer information storage unit 170 and performs user authentication (Step S154). The user authentication may use any method, and therefore description is omitted in the present example embodiment.

Subsequently, when the customer is authenticated, the management unit 110 acquires stock information stored in the stock information storage unit 160 and provides the first transmission unit 130 with the acquired stock information. The first transmission unit 130 transmits the stock information provided from the management unit 110 to the customer terminal 300 transmitting the login information to the delivery assistance device 100 (Step S155). A timing of transmission of the stock information by the first transmission unit 130 may be after the delivery assistance device 100 receives a transmission instruction of stock information from the customer terminal subsequently to performing the user authentication. The timing of transmission of the stock information by the first transmission unit 130 has only to be after detection of the customer starting shopping on an online shop by use of the customer terminal 300 (performing an operation for purchasing an item by use of the customer terminal 300) such as after the delivery assistance device 100 receives the aforementioned transmission instruction of stock information. Further, the item sales system 2 may be configured not to perform user authentication.

The reception unit 320 in the customer terminal 300 receives stock information from the delivery assistance device 100 (Step S156). Subsequently, the control unit 330 causes the display unit 340 to display a screen based on the received stock information (Step S157).

A screen (ordering screen) based on stock information, the screen being displayed by the display unit 340, will be described with reference to FIG. 16. FIG. 16 is a diagram illustrating an example of an ordering screen displayed by the display unit 340 in the customer terminal 300 according to the present example embodiment. It is assumed in the example in FIG. 16 that the stock information indicated in FIG. 10 has been transmitted to the customer terminal 300 from the delivery assistance device 100. The ordering screen illustrated in FIG. 16 displays a total quantity of stock of items held by the traveling vehicles (SA, SB, SC).

An "ADD TO CART" button in FIG. 16 is a button for accepting an instruction to add a relevant item to a cart on an online shop. In accordance with the instruction, the control unit 330 keeps information about the item put into the cart as cart information. Cart information includes information for identifying an item and a quantity of the item.

A "PROCEED TO PAYMENT SCREEN" button in FIG. 16 is a button for transitioning to a screen for making payment. A payment method can be selected on the payment screen. The payment method is not particularly limited, and therefore description is omitted in the present example embodiment. When an instruction to make payment is input, the acceptance unit 350 accepts the instruction.

A customer orders an item by use of an ordering screen as illustrated in FIG. 16. For example, when the customer depresses an "ADD TO CART" button illustrated in FIG. 16, the customer terminal 300 receives an order of the item by the customer, by the acceptance unit 350 accepting the depression of the button (Step S158). Subsequently, when an instruction to end shopping (an instruction to make payment) is input by the customer, the acceptance unit 350 accepts the instruction to end shopping (YES in Step S159). The acceptance unit 350 repeats Steps S158 and S159 until accepting an instruction to end shopping (while NO in Step S159). Then, the transmission unit 310 transmits order information to the delivery assistance device 100 (Step S160).

Further, the transmission unit 310 transmits delivery address information to the delivery assistance device 100 (Step S161). Step S161 may be performed prior to Step S160 or may be performed at a time with Step S160.

The second reception unit 140 in the delivery assistance device 100 receives the order information (Step S162). Further, the second reception unit 140 receives the delivery address information (Step S163). Then, the specification unit 180 specifies a traveling vehicle arriving earliest at a delivery address out of one or more traveling vehicles holding an ordered item, based on current positions of traveling vehicles each indicated by current position information and a position of the delivery address indicated by the delivery address information (Step S164). Further, the specification unit 180 estimates an arrival time at which the specified traveling vehicle arrives at the delivery address, based on the current position of the traveling vehicle and the position of the delivery address (Step S165). As described above, the specification unit 180 may perform Steps S164 and S165 in reverse order. Further, the specification unit 180 may perform Steps S164 and S165 at a time. The specification unit 180 may perform specification of a traveling vehicle and estimation of an arrival time by the same method or by different methods.

Then, the second transmission unit 150 transmits the order information along with the delivery address information to an on-board device 200 on the traveling vehicle specified in Step S165 (Step S166). Further, the first transmission unit 130 transmits the arrival time estimated in Step S166 to the customer terminal 300 transmitting the order information (Step S167). Further, based on the order information, the management unit 110 updates stock information about stock held by the specified traveling vehicle (Step S168). Steps S166 to S168 may be performed in any order.

When Step S166 ends, the on-board device 200 receives the order information. Consequently, the reception unit 230 in the on-board device 200 receives the order information transmitted from the delivery assistance device 100, and therefore the traveling vehicle loaded with the on-board device 200 can deliver the item to the customer, based on the order information.

Further, when Step S167 ends, the reception unit 320 in the customer terminal 300 receives, from the delivery assistance device 100, the estimated arrival time at which the traveling vehicle arriving earliest at the delivery address arrives at the delivery address (Step S169). Then, the control unit 330 causes the control unit 330 to display the estimated arrival time (Step S170).

The above concludes the sales processing of an item by online shopping by the item sales system 2.

As described above, the management unit 110 in the delivery assistance device 100 updates stock information, based on order information received by the second reception unit 140. Consequently, an item held by a traveling vehicle can be sold by use of an online shop allowing online shopping.

Further, the specification unit 180 specifies a traveling vehicle arriving earliest at a delivery address out of one or more traveling vehicles holding an ordered item, based on current positions of traveling vehicles each indicated by current position information and a position of the delivery address indicated by delivery address information. Then, the second transmission unit 150 transmits order information to the specified traveling vehicle. Consequently, a driver of the traveling vehicle receiving the order information can deliver the item held by the traveling vehicle to a customer placing the order.

Consequently, a customer doing online shopping by use of a customer terminal can more quickly receive an item which the customer wants. Accordingly, the delivery assistance device 100 according to the present example embodiment can shorten the time required for delivery in purchase of an item by online shopping.

Further, the specification unit 180 in the delivery assistance device 100 estimates an arrival time at which a specified traveling vehicle arrives at a delivery address, and the control unit 330 in a customer terminal 300 causes the display unit 340 to display the estimated arrival time. Consequently, a customer using the customer terminal 300 can readily understand when an ordered item arrives.

The second reception unit 140 may receive, from a customer terminal 300, information indicating a desired delivery time at which a customer wants delivery to be made.

In this case, the control unit 330 in the customer terminal 300 causes the display unit 340 to display, in a selectable manner, delivery times at which the customer wants delivery to be made. A selected delivery time indicates a time at which the customer wants delivery of an item to be made and therefore is referred to as a desired delivery time. Then, the control unit 330 provides the transmission unit 310 with information indicating the selected desired delivery time specified in accordance with an instruction accepted by the acceptance unit 350. Subsequently, the transmission unit 310 transmits the information indicating the desired delivery time to the delivery assistance device 100. Consequently, the second reception unit 140 receives the desired delivery time from the customer terminal 300.

Then, the specification unit 180 specifies a traveling vehicle arriving earliest by the desired delivery time at a delivery address. When an estimated arrival time of a traveling vehicle arriving earliest at the delivery address is later than the desired delivery time, the specification unit 180 may provide the first transmission unit 130 with the estimated arrival time along with information indicating the traveling vehicle arriving earliest at the delivery address through the management unit 110. By the first transmission unit 130 transmitting the estimated arrival time along with the information indicating the traveling vehicle to the customer terminal 300, the customer terminal 300 can display a screen indicating the item not arriving by the desired delivery time and when is the estimated arrival time. Accordingly, the customer terminal 300 can allow the customer to readily understand when the ordered item arrives.

Third Example Embodiment

Figure 17:
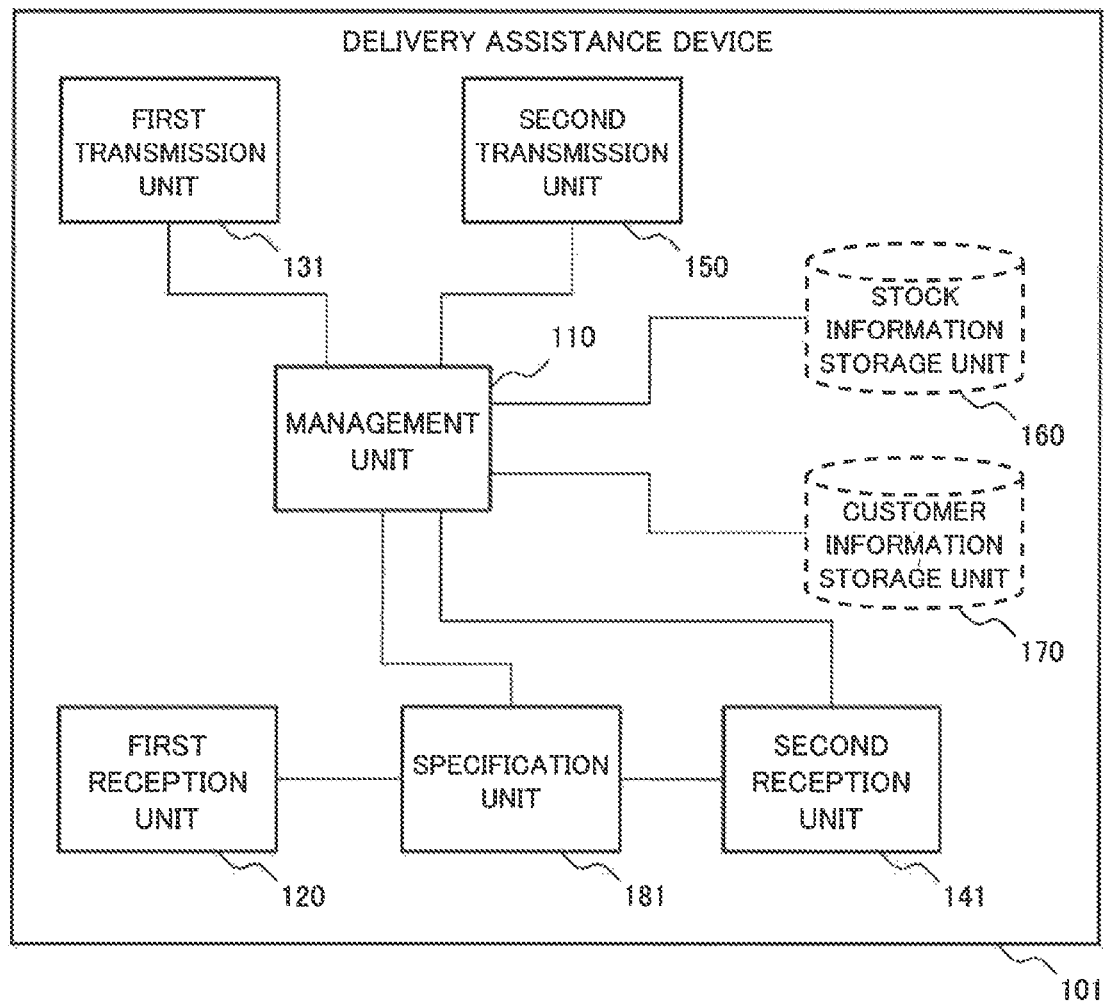
FIG. 17 is a functional block diagram illustrating a functional configuration example of a delivery assistance device in an item sales system according to a third example embodiment.

Next, a third example embodiment of the present disclosure will be described. FIG. 17 is a functional block diagram illustrating a functional configuration example of a delivery assistance device 101 according to the present example embodiment. For convenience of description, a component having the same function as that of a component included in a drawing described in the aforementioned second example embodiment is given the same reference sign, and description thereof is omitted.

As illustrated in FIG. 17, the delivery assistance device 101 according to the present example embodiment includes a management unit 110, a first reception unit 120, a first transmission unit 131, a second reception unit 141, a second transmission unit 150, a stock information storage unit 160, a customer information storage unit 170, and a specification unit 181. The delivery assistance device 101 according to the present example embodiment differs from the aforementioned delivery assistance device 100 in including the first transmission unit 131 in place of the first transmission unit 130, the second reception unit 141 in place of the second reception unit 140, and the specification unit 181 in place of the specification unit 180. The stock information storage unit 160 and the customer information storage unit 170 may be implemented with a storage device separate from the delivery assistance device 101. A system including the delivery assistance device 101 has the same configuration as that of the item sales system 2 described by use of FIG. 5 except that the delivery assistance device 100 is replaced by the delivery assistance device 101.

The delivery assistance device 100 described above specifies a traveling vehicle arriving earliest at a delivery address after receiving an order from a customer. According to the present example embodiment, the delivery assistance device 101 specifies the traveling vehicle during ordering, and notifies a customer of the specified traveling vehicle.

Similarly to the second reception unit 140, the second reception unit 141 receives, from a customer terminal 300, order information including information about an item ordered based on stock information. The second reception unit 141 further receives, from a customer terminal 300, delivery address information indicating a delivery address of an item and a transmission request of information about a traveling vehicle delivering an item ordered based on stock information.

The specification unit 181 specifies a traveling vehicle delivering ordered items fastest to a delivery address for each of the items, out of one or more traveling vehicles holding one or more of the ordered items, the traveling vehicle being specified based on current positions of traveling vehicles each indicated by current position information and a position of the delivery address. Then, the specification unit 181 provides the first transmission unit 131 with the specified traveling vehicle through the management unit 110.

Similarly to the first transmission unit 130, the first transmission unit 131 transmits stock information to a customer terminal 300. Further, the first transmission unit 131 transmits information about a specified traveling vehicle to a customer terminal 300.

The control unit 330 in a customer terminal 300 receiving the information about a specified traveling vehicle causes the display unit 340 to display information about a traveling vehicle arriving earliest at a delivery address for each of the items. An example of the screen will be described with reference to FIG. 18. An ordered items confirmation screen illustrated in FIG. 18 is a screen displayed, for example, after a customer adds "APPLE," "TOMATO," and "ORANGE" in the cart on the ordering screen illustrated in FIG. 16 and then depresses "PROCEED TO PAYMENT SCREEN." It is assumed in the description in the present example embodiment that when "PROCEED TO PAYMENT SCREEN" in FIG. 16 is depressed, the ordered items confirmation screen illustrated in FIG. 18 is displayed before transition to a payment screen. At this time, the transmission unit 310 transmits, to the delivery assistance device 101, a transmission request of information about a traveling vehicle delivering an item ordered based on stock information.

Then, as a response to the aforementioned transmission request, the reception unit 320 receives information indicating a traveling vehicle specified for each of the items. The control unit 330 causes the display unit 340 to display the ordered items confirmation screen, based on locally kept cart information and information indicating a traveling vehicle for each of the items, the information being received by the reception unit 320. As illustrated in FIG. 18, for example, "MANDARIN ORANGE" is held only by the traveling vehicle SC, and therefore information indicating that delivery is made by the traveling vehicle SC is displayed. Similarly, "TOMATO" is held only by the traveling vehicle SB, and therefore information indicating that delivery is made by the traveling vehicle SB is displayed. Further, as illustrated in FIG. 10, "APPLE" is held by both the traveling vehicle SB and the traveling vehicle SC. When the specification unit 181 specifies that a traveling vehicle delivering "APPLE" faster to the delivery address is the traveling vehicle SC, the reception unit 320 receives information indicating the traveling vehicle SC as information indicating a traveling vehicle related to "APPLE." Consequently, the control unit 330 can display information indicating that a traveling vehicle delivering "APPLE" faster to the delivery address is the traveling vehicle SC on the screen. The control unit 330 may cause the display unit 340 to display, for example, information indicating a time by which a traveling vehicle can make delivery, such as "TRAVELING VEHICLE CAPABLE OF MAKING DELIVERY WITHIN X MINUTES WILL MAKE DELIVERY" in place of or in addition to information specifying the traveling vehicle.

Then, when a "PROCEED TO PAYMENT SCREEN" button in FIG. 18 is depressed, the order is determined to be finalized, and the screen transitions to a screen for making payment. Subsequently, when payment is made, the control unit 330 provides the transmission unit 310 with information kept as cart information (information about an item included in the ordered items confirmation screen), information for identifying a customer, and information indicating a traveling vehicle delivering each of the items, as order information. Subsequently, the transmission unit 310 transmits the order information to the delivery assistance device 101.

The second reception unit 141 receives such order information. Then, the second transmission unit 150 transmits order information to a traveling vehicle being to deliver each of the items, based on the order information. For example, the second transmission unit 150 transmits, to an on-board device 200 on the traveling vehicle SB, order information including information about an item to be delivered by the traveling vehicle SB ("TOMATO" in the case of the example illustrated in FIG. 18), from information about every item included in the order information. Further, for example, the second transmission unit 150 transmits to an on-board device 200 on the traveling vehicle SC, order information including information about an item to be delivered by the traveling vehicle SC ("MANDARIN ORANGE" and "APPLE" in the case of the example illustrated in FIG. 18), from information about every item included in the order information.

Figure 19:
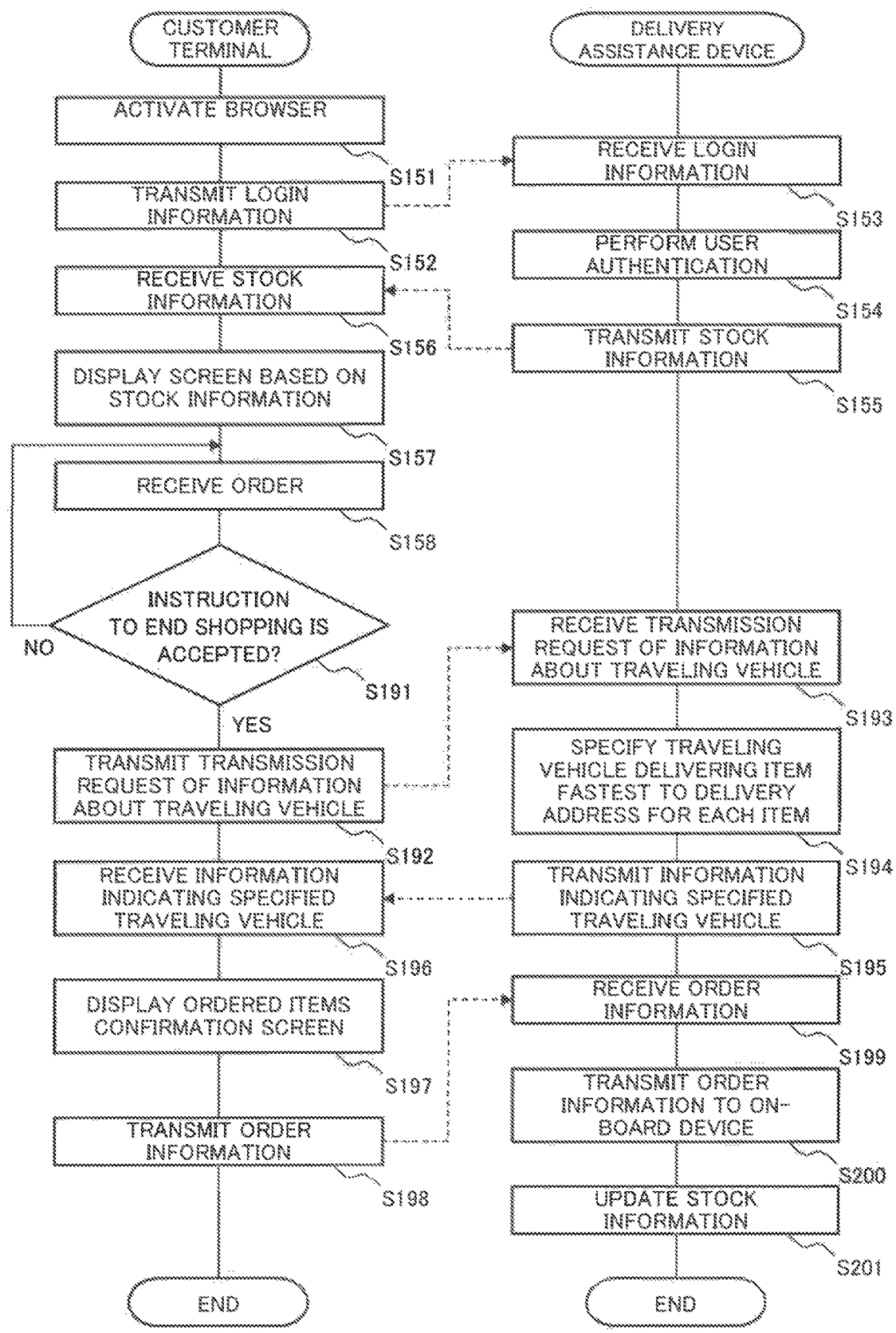
FIG. 19 is a flowchart illustrating an example of a flow of sales processing of an item by online shopping in the item sales system according to the third example embodiment.

FIG. 19 illustrates a processing flow in the item sales system 2 including the delivery assistance device 101 according to the present example embodiment. In FIG. 19, Steps S151 to S156 are similar to the aforementioned processing, and therefore description is omitted. Further, in FIG. 19 processing by a customer terminal 300 is described on the left and processing by the delivery assistance device 101 on the right. Further, in FIG. 19, a broken arrow between the respective processing steps indicates a flow of primary information. An information flow is not limited to a direction of an arrow, and for example, an ACK may be transmitted in a direction reverse to the arrow.

For example, when a customer depresses the "PROCEED TO PAYMENT SCREEN" button illustrated in FIG. 16, an instruction to end shopping is determined to be accepted, by an acceptance unit 350 accepting the depression of the button (YES in Step S191). The customer terminal 300 repeats Steps S158 and Step S191 until the acceptance unit 350 accepts an instruction to end shopping (while NO in Step S191).

Subsequently, for example, when the "PROCEED TO PAYMENT SCREEN" button in FIG. 16 is depressed, the order is determined to be finalized, and the display screen transitions to a screen for making payment. Then, when the customer makes payment, the control unit 330 generates a transmission request of information about a traveling vehicle delivering an item (an item ordered by the customer, based on stock information) put into the cart kept as cart information. It is assumed that the transmission request includes an item name indicating an item put into the cart and a quantity of the item. Then, the transmission unit 310 transmits the transmission request to the delivery assistance device 101 (Step S192).

The second reception unit 141 receives the transmission request requesting transmission of information about a traveling vehicle delivering items ordered by the customer (Step S193). The specification unit 181 specifies a traveling vehicle delivering the items fastest to a delivery address for each of the items, based on current positions of traveling vehicles and a position of the delivery address (Step S194). Then, the first transmission unit 131 transmits information indicating the traveling vehicle specified in Step S194 for each of the items to the customer terminal 300, as a response to the aforementioned transmission request (Step S195).

Then, the reception unit 320 receives the information indicating the traveling vehicle specified for each of the items from the delivery assistance device 101 (Step S196). Subsequently, the control unit 330 causes the display unit 340 to display the aforementioned ordered items confirmation screen (Step S197).

Subsequently, the transmission unit 310 transmits order information to the delivery assistance device 101 (Step S198). Then, the second reception unit 141 in the delivery assistance device 101 receives the order information (Step S199). Based on the order information received by the second reception unit 141, the second transmission unit 150 transmits the order information to a traveling vehicle delivering each of the items included in the order information (Step S200). The management unit 110 updates stock information, based on the order information (Step S201). Step S201 may be performed prior to Step S200 or may be performed at a time with Step S200.

Similarly to the second reception unit 140, the second reception unit 141 may receive, from the customer terminal 300, information indicating a desired delivery time at which the customer wants delivery to be made.

With such a configuration, the delivery assistance device 101 according to the present example embodiment can provide an effect similar to that by the aforementioned delivery assistance device 100.

About Hardware Configuration

Each component in each of the delivery assistance device, the on-board device, and the customer terminal, according to the respective example embodiments of the present disclosure, represents a functional unit block. For example, each component in each of the delivery assistance device, the on-board device, and the customer terminal is implemented in part or in whole with any combination of an information processing device 900 as illustrated in FIG. 20 and a program. FIG. 20 is a block diagram illustrating a hardware configuration example of the information processing device 900 implementing each component in each of the delivery assistance device, the on-board device, and the customer terminal. As an example, the information processing device 900 includes a configuration as described below.

A central processing unit (CPU) 901
A read only memory (ROM) 902
A random access memory (RAM) 903
A program 904 loaded into the RAM 903
A storage device 905 storing the program 904
A drive device 907 performing reading from and writing to a recording medium 906
A communication interface 908 connected to a communication network 909
An input-output interface 910 performing input and output of data
A bus 911 connecting the respective components Each component in each of the delivery assistance device, the on-board device, and the customer terminal, according to the respective example embodiments, is implemented by the CPU 901 acquiring and executing the program 904 implementing a function of the component. For example, the program 904 implementing the function of each component in each of the stock management device, the on-board device, and the customer terminal is pre-stored in the storage device 905 or the RAM 903, and is read by the CPU 901 as needed. The program 904 may be provided to the CPU 901 through the communication network 909; or the program may be pre-stored in the recording medium 906, and the drive device 907 may read the program and provide the program to the CPU 901.

There are various modified examples of the implementation method of each of the delivery assistance device, the on-board device, and the customer terminal. For example, each of the delivery assistance device, the on-board device, and the customer terminal may be implemented with any combination of a separate information processing device 900 and a program, for each component. Further, a plurality of components included in each of the delivery assistance device, the on-board device, and the customer terminal may be implemented with any combination of a single information processing device 900 and a program.

Further, each component in each of the delivery assistance device, the on-board device, and the customer terminal is implemented in part or in whole with another general-purpose or dedicated circuit, a processor, or the like, or a combination thereof. The above may be configured with a single chip or may be configured with a plurality of chips connected through a bus.

Each component in each of the delivery assistance device, the on-board device, and the customer terminal may be implemented in part or in whole with a combination of the aforementioned circuit or the like, and a program.

When each component in each of the delivery assistance device, the on-board device, and the customer terminal is implemented in part or in whole with a plurality of information processing devices, circuits, or the like, the plurality of information processing devices, circuits, or the like may be arranged in a concentrated manner or be arranged in a distributed manner. For example, the information processing devices, the circuits, or the like may be implemented in a form of being connected to one another through a communication network, such as a client-server system, a cloud computing system, or the like.

The respective aforementioned example embodiments are preferred example embodiments of the present disclosure, and the scope of the present disclosure is not limited to the respective aforementioned example embodiments; and a person skilled in the art can make example embodiments which include various changes through modifying and substituting the respective aforementioned example embodiments without departing from the spirit and scope of the present disclosure.

The aforementioned example embodiments may also be described in whole or in part as the following supplementary notes but are not limited thereto.

(Supplementary Note 1)

A delivery assistance device comprising:

management means for managing stock information about stock of an item held by each of a plurality of traveling vehicles;

first reception means for receiving, from each of the plurality of traveling vehicles, current position information indicating a current position of the traveling vehicle;

first transmission means for transmitting the stock information to a customer terminal;

second reception means for receiving, from the customer terminal, order information including information about an item ordered based on the stock information and delivery address information indicating a delivery address of the item;

specification means for specifying a traveling vehicle arriving earliest at the delivery address out of one or more of the traveling vehicles holding the ordered item, based on the current position of the traveling vehicle indicated by the current position information and the position of the delivery address indicated by the delivery address information; and second transmission means for transmitting the order information to the specified traveling vehicle, wherein the management means updates the stock information about stock held by the specified traveling vehicle, based on the order information.

(Supplementary Note 2)

The delivery assistance device according to Supplementary note 1, wherein the specification means estimates an arrival time at which the traveling vehicle arrives at the delivery address, based on the current position of the specified traveling vehicle and the position of the delivery address, and the first transmission means transmits the estimated arrival time to the customer terminal.

Supplementary Note 3)

The delivery assistance device according to Supplementary note 1 or 2, wherein the second reception means further receives, from the customer terminal, information indicating a desired delivery time at which a customer wants delivery to be made, and the specification means specifies a traveling vehicle arriving earliest at the delivery address out of one or more traveling vehicles arriving at the delivery address by the desired delivery time.

(Supplementary Note 4)

A customer terminal comprising:

transmission means for transmitting, to a delivery assistance device managing stock information about stock of an item held by each of a plurality of traveling vehicles, order information including information about an item ordered based on the stock information transmitted from the delivery assistance device and delivery address information indicating a delivery address of an item;

reception means for receiving an estimated arrival time at which a traveling vehicle arrives at the delivery address, the traveling vehicle being specified arriving earliest at the delivery address out of one or more of the traveling vehicles holding the ordered item based on a current position of the traveling vehicle and a position of the delivery address indicated by the delivery address information; and display control means for causing a display device to display the estimated arrival time.

(Supplementary Note 5)

The customer terminal according to Supplementary note 4, wherein the display control means causes the display device to display, in a selectable manner, a desired delivery time at which a customer wants delivery to be made, and the transmission means transmits information indicating the selected desired delivery time to the delivery assistance device.

(Supplementary Note 6)

An item sales system comprising:

a delivery assistance device;

an on-board device being loaded on each of a plurality of traveling vehicles and transmitting current position information indicating a current position of each of the plurality of traveling vehicles to the delivery assistance device; and one or more customer terminals, wherein the delivery assistance device includes:

management means for managing stock information about stock of an item held by each of the plurality of traveling vehicles;

first reception means for receiving the current position information;

first transmission means for transmitting the stock information to a customer terminal;

second reception means for receiving, from the customer terminal, order information including information about an item ordered based on the stock information and delivery address information indicating a delivery address of the item;

specification means for specifying a traveling vehicle arriving earliest at the delivery address out of one or more of the traveling vehicles holding the ordered item, based on a current position of the traveling vehicle indicated by the current position information and a position of the delivery address indicated by the delivery address information; and second transmission means for transmitting the order information to an on-board device loaded on the specified traveling vehicle, wherein the management means updates the stock information about stock held by the specified traveling vehicle, based on the order information.

(Supplementary Note 7)

The item sales system according to Supplementary note 6, wherein the specification means estimates an arrival time at which the traveling vehicle arrives at the delivery address, based on the current position of the specified traveling vehicle and the position of the delivery address, and the first transmission means transmits the estimated arrival time to the customer terminal.

(Supplementary Note 8)

The item sales system according to Supplementary note 6 or 7, wherein the second reception means further receives, from the customer terminal, information indicating a desired delivery time at which a customer wants delivery to be made, and the specification means specifies a traveling vehicle arriving earliest at the delivery address by the desired delivery time.

(Supplementary Note 9)

A delivery assistance method comprising:

managing stock information about stock of an item held by each of a plurality of traveling vehicles;

receiving, from each of the plurality of traveling vehicles, current position information indicating a current position of the traveling vehicle;

transmitting the stock information to a customer terminal;

receiving, from the customer terminal, order information including information about an item ordered based on the stock information;

receiving delivery address information indicating a delivery address of the item from the customer terminal;

specifying a traveling vehicle arriving earliest at the delivery address out of one or more of the traveling vehicles holding the ordered item, based on a current position of the traveling vehicle indicated by the current position information and a position of the delivery address indicated by the delivery address information;

transmitting the order information to the specified traveling vehicle; and updating the stock information about stock held by the specified traveling vehicle, based on the order information.

(Supplementary Note 10)

The delivery assistance method according to Supplementary note 9, further comprising:

estimating an arrival time at which the traveling vehicle arrives at the delivery address, based on the current position of the specified traveling vehicle and the position of the delivery address; and transmitting the estimated arrival time to the customer terminal.

(Supplementary Note 11)

A display control method comprising:

receiving stock information from a delivery assistance device managing the stock information about stock of an item held by each of a plurality of traveling vehicles;

transmitting, to the delivery assistance device, order information including information about an item ordered based on the stock information and delivery address information indicating a delivery address of the item;

receiving an estimated arrival time at which a traveling vehicle arrives at the delivery address, the traveling vehicle being specified arriving earliest at the delivery address out of one or more of the traveling vehicles holding the ordered item based on a current position of the traveling vehicle and a position of the delivery address indicated by the delivery address information; and causing a display device to display the estimated arrival time.

(Supplementary Note 12)

The display control method according to Supplementary note 11, further comprising:

causing the display device to display, in a selectable manner, a desired delivery time at which a customer wants delivery to be made; and transmitting information indicating the selected desired delivery time to the delivery assistance device.

(Supplementary note 13)

A delivery assistance method in an item sales system including a delivery assistance device, an on-board device loaded on each of a plurality of traveling vehicles, and one or more customer terminals, the delivery assistance method comprising:

managing, by the delivery assistance device, stock information about stock of an item held by each of the plurality of traveling vehicles;

transmitting, by the on-board device, current position information indicating a current position of a traveling vehicle loaded with the on-board device;

receiving, by the delivery assistance device, the current position information;

transmitting, by the delivery assistance device, the stock information to a customer terminal;

transmitting, by the customer terminal, to the delivery assistance device, order information including information about an item ordered based on the stock information received from the delivery assistance device and delivery address information indicating a delivery address of the item;

receiving, by the delivery assistance device, the order information and the delivery address information from the customer terminal;

specifying, by the delivery assistance device, a traveling vehicle arriving earliest at the delivery address out of one or more of the traveling vehicles holding the ordered item, based on a current position of the traveling vehicle indicated by the current position information and a position of the delivery address indicated by the delivery address information;

transmitting, by the delivery assistance device, the order information to an on-board device loaded on the specified traveling vehicle; and updating, by the delivery assistance device, the stock information about stock held by the specified traveling vehicle, based on the order information.

(Supplementary Note 14)

The delivery assistance method according to Supplementary note 13, further comprising:

estimating, by the delivery assistance device, an arrival time at which the traveling vehicle arrives at the delivery address, based on the current position of the specified traveling vehicle and the position of the delivery address;

transmitting, by the delivery assistance device, the estimated arrival time to the customer terminal;

receiving, by the customer terminal, the estimated arrival time; and causing, by the customer terminal, the display device to display the estimated arrival time.

(Supplementary Note 15)

A non-transitory computer readable storage medium storing a program that causes a computer to execute:

a process of managing stock information about stock of an item held by each of a plurality of traveling vehicles;

a process of receiving, from each of the plurality of traveling vehicles, current position information indicating a current position of the traveling vehicle;

a process of transmitting the stock information to a customer terminal;

a process of receiving, from the customer terminal, order information including information about an item ordered based on the stock information and delivery address information indicating a delivery address of the item;

a process of specifying a traveling vehicle arriving earliest at the delivery address out of one or more of the traveling vehicles holding the ordered item, based on the current position of the traveling vehicle indicated by the current position information and the position of the delivery address indicated by the delivery address information; and a process of transmitting the order information to the specified traveling vehicle, wherein a process of updating the stock information about stock held by the specified traveling vehicle, based on the order information.

(Supplementary Note 16)

The storage medium according to Supplementary note 15, wherein, the program that causes a computer to execute:

a process of estimating an arrival time at which the traveling vehicle arrives at the delivery address, based on the current position of the specified traveling vehicle and the position of the delivery address, and a process of transmitting the estimated arrival time to the customer terminal.

(Supplementary Note 17)

A non-transitory computer readable storage medium storing a program that causes a computer to execute:

a process of transmitting, to a delivery assistance device managing stock information about stock of an item held by each of a plurality of traveling vehicles, order information including information about an item ordered based on the stock information transmitted from the delivery assistance device and delivery address information indicating a delivery address of an item;

a process of receiving an estimated arrival time at which a traveling vehicle arrives at the delivery address, the traveling vehicle being specified arriving earliest at the delivery address out of one or more of the traveling vehicles holding the ordered item based on a current position of the traveling vehicle and a position of the delivery address indicated by the delivery address information; and a process of causing a display device to display the estimated arrival time.

(Supplementary Note 18)

The storage medium according to Supplementary note 17, wherein, the program that causes a computer to execute:

a process of causing the display device to display, in a selectable manner, a desired delivery time at which a customer wants delivery to be made, and a process of transmitting information indicating the selected desired delivery time to the delivery assistance device.

This application claims priority based on Japanese Patent Application No. 2016-162594 filed on Aug. 23, 2016, the disclosure of which is hereby incorporated by reference thereto in its entirety.

REFERENCE SIGNS LIST

1 Item sales system
2 Item sales system
10 Delivery assistance device

11 Management unit
12 First reception unit
13 First transmission unit
14 Second reception unit
15 Second transmission unit
16 Specification unit
20 On-board device
30 Customer terminal
31 Transmission unit
32 Reception unit
33 control unit
100 Delivery assistance device
101 Delivery assistance device
110 Management unit
120 First reception unit
130 First transmission unit
131 First transmission unit
140 Second reception unit
141 Second reception unit
150 Second transmission unit
160 Stock information storage unit
170 Customer information storage unit
180 Specification unit
181 Specification unit
200 On-board device
210 Positioning unit
220 Transmission unit
230 Reception unit
300 Customer terminal
310 Transmission unit
320 Reception unit
330 Control unit
340 Display unit
350 Acceptance unit

The invention claimed is:

1. A delivery assistance device comprising:
a memory storing instructions; and
one or more processors configured to execute the instructions to:
  manage stock information about stock of an item carried by each of a plurality of vehicles traveling a predetermined traveling route;
  receive, from each of the plurality of vehicles, current position information indicating a current position of the vehicle;
  transmit the stock information to a customer terminal;
  receive, from the customer terminal, order information including information about the item which is carried by the vehicles and which is ordered based on the stock information and delivery address information indicating a delivery address of the item;
  specify a vehicle that can arrive earliest at the delivery address out of one or more of the vehicles carrying the item ordered, based on the current position of the vehicle indicated by the current position information and the position of the delivery address indicated by the delivery address information;
  transmit the order information to the specified vehicle; and
  update the stock information about stock carried by the specified vehicle, based on the order information.

2. The delivery assistance device according to claim 1, wherein
the one or more processors are further configured to execute the instructions to:
  estimate an arrival time at which the vehicle may arrive at the delivery address, based on the current position of the specified vehicle and the position of the delivery address, and
  transmit the estimated arrival time to the customer terminal.

3. The delivery assistance device according to claim 1, wherein
the one or more processors are further configured to execute the instructions to:
  receive, from the customer terminal, information indicating a desired delivery time at which a customer wants delivery to be made, and
  specify a vehicle that can arrive earliest at the delivery address out of one or more vehicles that can arrive at the delivery address by the desired delivery time.

4. A customer terminal comprising:
a memory storing instructions; and
one or more processors configured to execute the instructions to:
  transmit, to a delivery assistance device managing stock information about stock of an item carried by each of a plurality of vehicles traveling a predetermined traveling route, order information including information about the item which is carried by the vehicles and which is ordered based on the stock information transmitted from the delivery assistance device and delivery address information indicating a delivery address of an item;
  receive an estimated arrival time at which a vehicle may arrive at the delivery address, the vehicle being specified as arriving earliest at the delivery address out of one or more of the vehicles carrying the item ordered based on a current position of the vehicle and a position of the delivery address indicated by the delivery address information; and
  cause a display device to display the estimated arrival time.

5. The customer terminal according to claim 4, wherein
the one or more processors are further configured to execute the instructions to:
  cause the display device to display, in a selectable manner, a desired delivery time at which a customer wants delivery to be made, and
  transmit information indicating the selected desired delivery time to the delivery assistance device.

6. A delivery assistance method implemented by at least one hardware processor and comprising:
managing stock information about stock of an item carried by each of a plurality of vehicles traveling a predetermined traveling route;
receiving, from each of the plurality of vehicles, current position information indicating a current position of the vehicle;
transmitting the stock information to a customer terminal;
receiving, from the customer terminal, order information including information about the item which is carried by the vehicles and which is ordered based on the stock information;
receiving delivery address information indicating a delivery address of the item from the customer terminal;
specifying a vehicle that can arrive earliest at the delivery address out of one or more of the vehicles carrying the item ordered, based on a current position of the vehicle indicated by the current position information and a position of the delivery address indicated by the delivery address information;

transmitting the order information to the specified vehicle; and updating the stock information about stock held by the specified vehicle, based on the order information.

7. The delivery assistance method according to claim 6, further comprising:

estimating an arrival time at which the vehicle may arrive at the delivery address, based on the current position of the specified vehicle and the position of the delivery address; and transmitting the estimated arrival time to the customer terminal.

* * * * *